(12) United States Patent
Lundy et al.

(10) Patent No.: US 11,378,925 B2
(45) Date of Patent: Jul. 5, 2022

(54) MOTORIZED WINDOW TREATMENT MONITORING AND CONTROL

(71) Applicant: Lutron Technology Company LLC, Coopersburg, PA (US)

(72) Inventors: Stephen Lundy, Coopersburg, PA (US); Brent Protzman, Easton, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 163 days.

(21) Appl. No.: 16/906,360

(22) Filed: Jun. 19, 2020

(65) Prior Publication Data

US 2021/0041840 A1     Feb. 11, 2021

Related U.S. Application Data

(63) Continuation of application No. 16/197,627, filed on Nov. 21, 2018, now Pat. No. 10,691,086, which is a
(Continued)

(51) Int. Cl.
| | |
|---|---|
| *G05B 15/02* | (2006.01) |
| *G05B 11/01* | (2006.01) |
| *E06B 9/68* | (2006.01) |

(52) U.S. Cl.
CPC ............... *G05B 15/02* (2013.01); *E06B 9/68* (2013.01); *G05B 11/01* (2013.01); *E06B 2009/6827* (2013.01); *G05B 2219/2642* (2013.01)

(58) Field of Classification Search
CPC .......... G05B 15/02; G05B 11/01; G05B 2219/2642; E06B 9/68; E06B 2009/6827
(Continued)

(56) References Cited

U.S. PATENT DOCUMENTS

| | | |
|---|---|---|
| 5,248,919 A | 9/1993 | Hanna et al. |
| 7,391,297 B2 | 6/2008 | Cash et al. |

(Continued)

FOREIGN PATENT DOCUMENTS

| | | |
|---|---|---|
| EP | 2492884 A1 | 8/2012 |
| WO | 2010140090 A1 | 12/2010 |

OTHER PUBLICATIONS

Lee et al., "Integrated Performance of an Automated Venetian Blind/Electric Lighting System in a Full-Scale Private Office", Proceedings of the ASHRAE/DOE/BTECC Conference, Thermal Performance of the Exterior Envelopes of Buildings VII, Clearwater Beach, Florida, Sep. 1998, 26 pages.

(Continued)

*Primary Examiner* — Michael J Brown
(74) *Attorney, Agent, or Firm* — Michael Czarnecki; Glen Farbanish; Philip Smith

(57) ABSTRACT

Motorized window treatments may each adjust a position of a covering material to allow light into a space in a building. The control information for controlling the motorized window treatments may be stored and/or accessed to understand how the motorized window treatments are operating. The control information may indicate a control state and/or a position of the covering material when an identified daylight intensity is being received at the space. The control information may inform a user of the operation of the motorized window treatments and allow the user to adjust various control parameters by which the motorized window treatments may be controlled. Recommended adjustments may also be provided to the user based on a user-identified problem with the operation of the motorized window treatments. The recommended adjustments to the control parameters may be accepted by the user and may be stored for being accessed and/or edited.

21 Claims, 15 Drawing Sheets

Related U.S. Application Data continuation of application No. 14/820,420, filed on Aug. 6, 2015, now Pat. No. 10,139,791.

(60) Provisional application No. 62/054,089, filed on Sep. 23, 2014, provisional application No. 62/034,117, filed on Aug. 6, 2014.

(58) Field of Classification Search
USPC .......................................................... 700/275
See application file for complete search history.

(56) References Cited

U.S. PATENT DOCUMENTS

| | | | |
|---|---|---|---|
| 8,009,042 B2 | 8/2011 | Steiner et al. | |
| 8,199,010 B2 | 6/2012 | Sloan et al. | |
| 8,228,184 B2 | 7/2012 | Blakeley et al. | |
| 8,288,981 B2 | 10/2012 | Zaharchuk et al. | |
| 8,410,706 B2 | 4/2013 | Steiner et al. | |
| 8,451,116 B2 | 5/2013 | Steiner et al. | |
| 8,508,169 B2 | 8/2013 | Zaharchuk et al. | |
| 8,723,466 B2 | 5/2014 | Chambers et al. | |
| 8,786,236 B2 | 7/2014 | Zaharchuk et al. | |
| 8,866,343 B2 | 10/2014 | Abraham et al. | |
| 10,139,791 B2 * | 11/2018 | Lundy | G05B 11/01 |
| 10,691,086 B2 * | 6/2020 | Lundy | E06B 9/68 |
| 2003/0098133 A1 * | 5/2003 | Palmer | E06B 9/68 160/310 |
| 2005/0110416 A1 | 5/2005 | Veskovic | |
| 2006/0028212 A1 | 2/2006 | Steiner et al. | |
| 2008/0092075 A1 | 4/2008 | Jacob et al. | |
| 2009/0206983 A1 | 8/2009 | Knode et al. | |
| 2011/0164304 A1 | 7/2011 | Brown et al. | |
| 2012/0253483 A1 | 10/2012 | Cavarec et al. | |
| 2013/0030589 A1 | 1/2013 | Pessina et al. | |
| 2013/0063065 A1 | 3/2013 | Berman et al. | |
| 2013/0113284 A1 | 5/2013 | Altonen et al. | |
| 2014/0132475 A1 | 5/2014 | Bhutani et al. | |
| 2014/0156079 A1 | 6/2014 | Courtney et al. | |
| 2014/0163742 A1 | 6/2014 | Element | |
| 2014/0262057 A1 | 9/2014 | Chambers et al. | |
| 2014/0265568 A1 | 9/2014 | Crafts et al. | |
| 2015/0368967 A1 | 12/2015 | Lundy et al. | |

OTHER PUBLICATIONS

Lee et al., "Low-Cost Networking for Dynamic Window Systems", Energy and Buildings, vol. 36, 2004, 13 pages.

Somfy Digital Network, "User Manual Animeo IP/RS485 1.0 Visual Configuration", Mar. 5, 2014, 98 pages.

SomfySystems, "Animeo IP Webinar 2014", https://www.youtube.com/watch?v=1Dhb515uEgQ, Jan. 16, 2014, 1 page.

* cited by examiner

Automated Window Treatment Control Adjustment

When did the problem occur? [Date ∨] [Time ∨] ← 502

Manual Overrides: 11:32 AM
12:51 PM ← 508
3:34 PM

Where did the problem occur? [Location ∨] ← 504

What is the problem?
● Too much light. I want my shades closed more.
○ Not enough light. I want my shades opened more.
○ Frequent shade movements are distracting.

Automated Window Treatment Control Adjustment Wizard

We recommend lowering your Bright Override Threshold. ← 852

Current value: 5,000 fc ← 854
Recommended value: 4,000 fc ← 856

Apply to:
- ● All shade groups in room
- ○ All shade groups on floor
- ○ All shade groups with same facing direction

← 858

[Preview Adjustments] ← 860

[Make Adjustments] ← 862

MOTORIZED WINDOW TREATMENT MONITORING AND CONTROL

CROSS-REFERENCE TO RELATED APPLICATIONS

This application is a continuation of U.S. patent application Ser. No. 16/197,627, filed Nov. 21, 2018, which is a continuation of U.S. patent application Ser. No. 14/820,420, filed Aug. 6, 2015, now U.S. Pat. No. 10,139,791, issued Nov. 27, 2018, which claims the benefit of U.S. Provisional Application No. 62/034,117, filed Aug. 6, 2014, and U.S. Provisional Application No. 62/054,089, filed Sep. 23, 2014, the entire disclosures of which are incorporated by reference herein in their entireties as if fully set forth.

BACKGROUND

A user environment, such as a residence or an office building for example, may include a load control system that may be installed therein for controlling electrical loads. The load control system may include various types of load control devices for controlling the electrical loads. The load control devices include lighting control devices (e.g., dimmer switches, ballasts, or light-emitting diode (LED) drivers) for controlling an amount of power provided to lighting loads, motorized window treatments for controlling the position of covering materials that may be mounted in front of windows or openings, thermostats for controlling heating and cooling systems, and alternating-current (AC) plug-in load control devices for controlling an amount of power provided to floor lamps, table lamps, or an electrical load of an appliance or other device that is plugged in to the AC plug-in load control device. The load control system includes a system controller, such as a server or similar computing device for example, that is used to send messages to the load control devices for controlling the electrical loads in response to information received from various input devices, such as a daylight sensor that senses the amount of natural daylight in the load control environment, an occupancy sensor that senses an occupancy status in the load control environment, a radio window sensor that senses the amount of daylight being received from outside of the load control environment, or a remote control device that is used for manually controlling the load control devices.

In current load control systems, the system controller maintains automated control information that is used to perform automated control of the motorized window treatments. The automated control of the motorized window treatments is coordinated with the control of the other electrical load control devices, such as the lighting control devices and the control devices of the heating and cooling systems, to conserve energy and increase comfort to occupants. The automated control information indicates various positions to which the covering material should be adjusted throughout the course of a day. The system controller overrides the automated control of the motorized window treatments when the amount of daylight in the load control environment rises above or below predefined thresholds to decrease or increase, respectively, the amount of daylight in the load control environment.

A user of the load control system, such as a building manager, resident, or occupant of the load control environment, may access the system controller via a workstation (e.g., desktop or laptop computer) to access and configure settings for controlling load control devices in the load control system. For example, the user may access the settings for automated control of the motorized window treatments and the settings for overriding the automated control of the motorized window treatments.

Though users may be able to access and configure settings for controlling load control devices in the load control system, the users may be unaware of the adjustments to be made. Additionally, information about the load control system cannot be easily accessed or configured. For example, the user may be unaware of the proper changes to make to the settings for the automated control of the motorized window treatments or the settings for overriding the automated control of the motorized window treatments. This may be due to a lack of useful information regarding the system operation and/or a presentation of the information in a useful format (e.g., too many settings being displayed causing confusion and difficulty to the user). As a result, system configuration is not easily performed and, when performed, may not accurately reflect the user's desired configuration.

SUMMARY

As described herein, a load control system may be used to control one or more electrical loads therein. The electrical loads may include motorized window treatments that may each adjust a position of a covering material, such as a window shade, to allow light into a space in a building. The motorized window treatments may be controlled according to one or more control states. The control states may include an automated control state and one or more override states that may override the automated control state. The override states may include a bright override state, a manual override state, a hold visor override state, and/or a dark override state.

Control information may be stored that logs the control of the motorized window treatments over a period of time. The control information may be accessed for display to a user to show the operation of the motorized window treatments over a time period. The control information may indicate the control states and/or the position of the motorized window treatments over the time period. The position of the covering material may correspond to a covering material position of the control state.

The motorized window treatment control information may be displayed to a user in a manner that allows the user to determine how the motorized window control treatments are operating to control the position of a covering material. For example, the position of the motorized window treatment and the daylight intensity may be provided to the user to show the shade position for a given daylight intensity over a period of time. The control state that is being used to control the position of the covering material may also be provided to the user. The motorized window treatment control parameters that are used by each control state to control the position of the covering material may also be displayed to the user.

The motorized window treatment control parameters may include automated control parameters for controlling the motorized window treatments during the automated control state and/or override parameters for controlling the motorized window treatments during the override states. The automated control parameters may include a maximum daylight penetration distance into a space, a height of a workstation in the space, a minimum amount of time between movements of the covering material for the motorized window treatments, a visor position for the covering material, a facing direction for a building façade, shade heights for the motorized window treatment, a start of the day automated control behavior (e.g., behavior at and/or after sunrise), and/or an end of the day automated control behavior (e.g., behavior at and/or before sunset). The override parameters for the bright override state, the hold visor override state, and the dark override state may include an override threshold at which the override state may be entered, an override position for the covering material, an override delay time period for which the override state may be performed, and/or an override hysteresis. The dark override state may include a morning ramping period and/or an evening ramping period for the override threshold.

The motorized window treatment control information, the daylight intensity, and/or the motorized window treatment control parameters may be displayed a graphical display. The graphical display may include indications of each movement of the position of the motorized window treatment. A user may select the indications to obtain detailed information about the movements, such as the time at which the movement occurred and/or the reason for the movement. The graphical display may allow adjustment to the motorized window treatment control parameters being displayed. Recommended adjustments to the motorized window treatment control parameters may also, or alternatively, be provided on the graphical display.

Recommended adjustments to the motorized window treatment control parameters may be determined based on input from the user. The user may indicate a perceived problem with an operation of the motorized window treatments, a time period in which the problem occurred, and/or a location in which the problem occurred. Based on the time period and/or the location in which the problem occurred, the motorized window treatment control parameters used to control the motorized window treatment during the problem may be determined. A recommended adjustment may be made to adjust the motorized window treatment control parameters to avoid the indicated problem under similar conditions. For example, if a user indicates that too much light is being provided in a space, a recommended adjustment may be provided to decrease the bright override threshold, such that the position of the motorized window treatments may be lowered at a lower daylight intensity.

The recommended adjustments to the motorized window treatment control parameters may be accepted by a user and may be stored for being accessed and/or edited. The adjustments to the motorized window treatment control parameters may be undone or edited once accessed by a user. If the adjustments are undone, the motorized window treatment control parameter that is undone may revert back to a previous value or a default value.

While various examples are provided herein for providing motorized window treatment control information and/or recommending adjustments to motorized window treatment control parameters, the examples are not meant to be limiting.

BRIEF DESCRIPTION OF THE DRAWINGS

FIG. 5 depicts an example user interface that may be used for receiving user input regarding the operation of motorized window treatments.

FIG. 8 depicts an example user interface that may be used for providing recommended adjustments to motorized window treatment control parameters.

DETAILED DESCRIPTION

The foregoing summary, as well as the following detailed description, may be better understood when read in conjunction with the appended drawings. The drawings are shown for purposes of illustration and are non-limiting.

Figure 1:
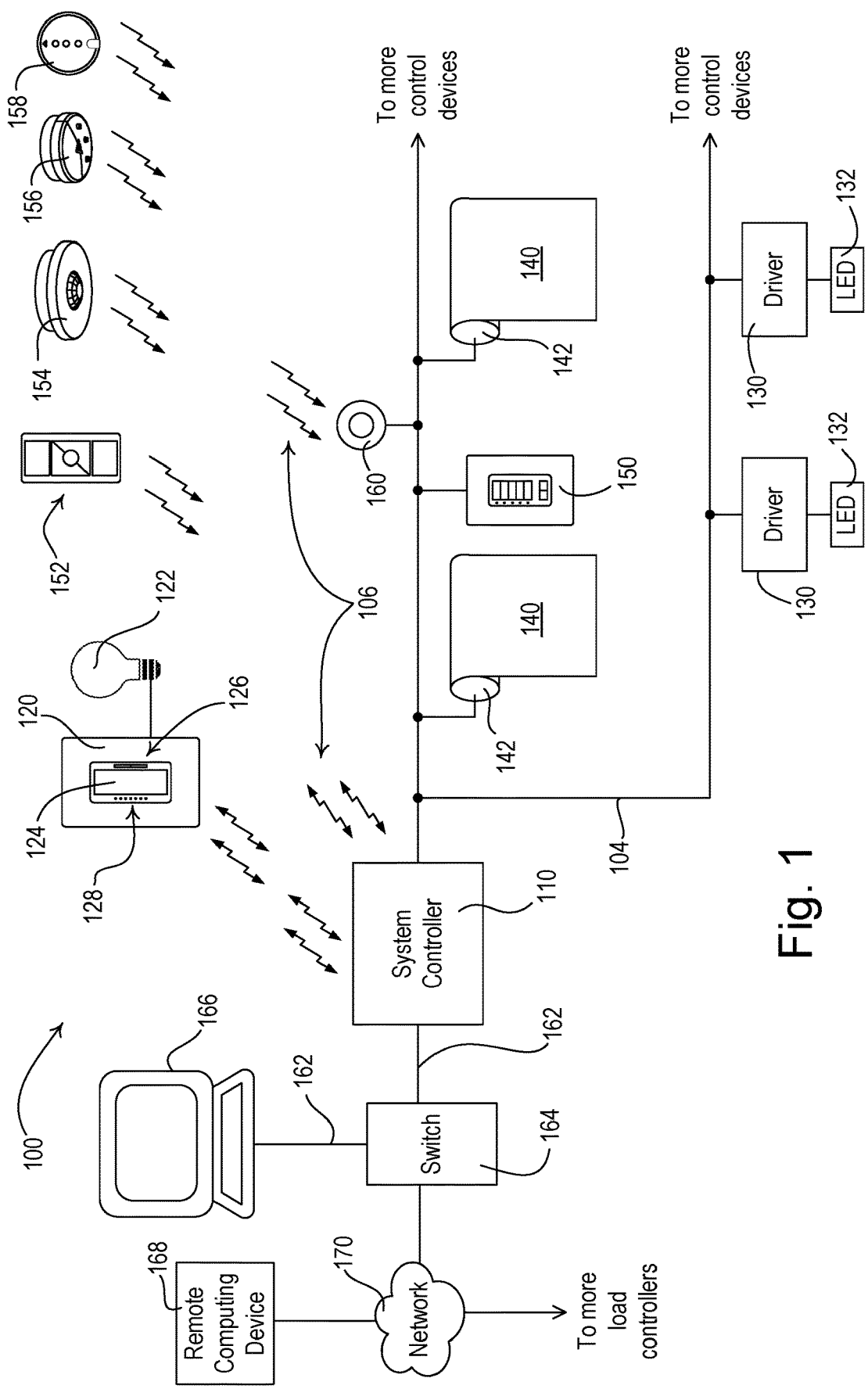
FIG. 1 is a simplified block diagram of an example load control system.

FIG. 1 is a simple diagram of an example load control system for controlling the amount of power delivered from an alternating-current (AC) power source (not shown) to one or more electrical loads. The load control system 100 may comprise a system controller 110 (e.g., a load controller or a central controller) operable to transmit and/or receive digital messages via a wired and/or a wireless communication link. For example, the system controller 110 may be coupled to one or more wired control devices via a wired digital communication link 104. The system controller 110 may be configured to transmit and/or receive wireless signals, e.g., radio-frequency (RF) signals 106, to communicate with one or more wireless control devices. The load control system 100 may comprise a number of control-source devices and/or a number of control-target devices for controlling an electrical load. The control-source devices may be input devices operable to transmit digital messages configured to control an electrical load via a control-target device. For example, control-source devices may transmit the digital messages in response to user input, occupancy/vacancy conditions, changes in measured light intensity, etc. The control-target devices may be load control devices operable to receive digital messages and control respective electrical loads in response to the received digital messages. A single control device of the load control system 100 may operate as both a control-source and a control-target device. The system controller 110 may be configured to receive digital messages from the control-source devices and transmit digital messages to the control-target devices in response to the digital messages received from the control-source devices.

The load control system 100 may comprise a load control device, such as a dimmer switch 120, for controlling a lighting load 122. The dimmer switch 120 may be adapted to be wall-mounted in a standard electrical wallbox. Alternatively, the dimmer switch 120 may comprise a tabletop or plug-in load control device. The dimmer switch 120 may comprise a toggle actuator 124 (e.g., a button) and/or an intensity adjustment actuator 126 (e.g., a rocker switch). Successive actuations of the toggle actuator 124 may toggle, e.g., turn off and on, the lighting load 122. Actuations of an upper portion or a lower portion of the intensity adjustment actuator 126 may respectively increase or decrease the amount of power delivered to the lighting load 122 and thus increase or decrease the intensity of the lighting load from a minimum intensity (e.g., approximately 1%) to a maximum intensity (e.g., approximately 100%). The dimmer switch 120 may further comprise a plurality of visual indicators 128, e.g., light-emitting diodes (LEDs), which may be arranged in a linear array and/or may be illuminated to provide feedback of the intensity of the lighting load 122. Examples of wall-mounted dimmer switches are described in greater detail in U.S. Pat. No. 5,248,919, issued Sep. 28, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The dimmer switch 120 may be configured to receive digital messages from the system controller 110 via the RF signals 106 and to control the lighting load 122 in response to the received digital messages. Examples of dimmer switches operable to transmit and receive digital messages is described in greater detail in U.S. Patent Application Publication No. 2009/0206983, published Aug. 20, 2009, entitled COMMUNICATION PROTOCOL FOR A RADIO-FREQUENCY LOAD CONTROL SYSTEM, the entire disclosure of which is hereby incorporated by reference. The dimmer switch 120 may also, or alternatively, be coupled to the wired digital communication link 104.

The load control system 100 may further comprise one or more remotely-located load control devices, such as light-emitting diode (LED) drivers 130 for driving respective LED light sources 132 (e.g., LED light engines). The LED drivers 130 may be located remotely, for example, in the lighting fixtures of the respective LED light sources 132. The LED drivers 130 may be configured to receive digital messages from the system controller 110 via the digital communication link 104 and to control the respective LED light sources 132 in response to the received digital messages. The LED drivers 130 may be coupled to a separate digital communication link, such as an Ecosystem® or digital addressable lighting interface (DALI) communication link, and the load control system 100 may include a digital lighting controller coupled between the digital communication link 104 and the separate communication link. The LED drivers 132 may include internal RF communication circuits or be coupled to external RF communication circuits (e.g., mounted external to the lighting fixtures, such as to a ceiling) for transmitting and/or receiving the RF signals 106. The load control system 100 may further comprise other types of remotely-located load control devices, such as, for example, electronic dimming ballasts for driving fluorescent lamps.

The load control system 100 may further comprise a plurality of daylight control devices, e.g., motorized window treatments 140, such as motorized roller shades, to control the amount of daylight entering the building in which the load control system may be installed. Each motorized window treatment 140 may comprise a covering material (e.g., a shade fabric). The covering material may be wound around a roller tube for raising and/or lowering the shade fabric. Each motorized window treatment 140 may comprise an electronic drive unit (EDU) 142. If the motorized window treatment is a motorized roller shade, the EDU 142 may be located inside the roller tube of the motorized roller shade. The electronic drive units 142 may be coupled to the digital communication link 104 for transmitting and/or receiving digital messages. The electronic drive units 142 may include a control circuit that may be configured to adjust the position of a window treatment fabric in response to digital messages received from the system controller 110 via the digital communication link 104. Each of the electronic drive units 142 may include memory for storing association information for associations with other devices and/or instructions for controlling the motorized window treatments 140. Each electronic drive unit 142 may also, or alternatively, comprise an internal RF communication circuit or be coupled to an external RF communication circuit (e.g., located outside of the roller tube for motorized roller shades) for transmitting and/or receiving the RF signals 106. While the motorized window treatments 140 are illustrated in FIG. 1 as a motorized roller shade, one or more of the motorized window treatments 140 may comprise other types of daylight control devices, such as, for example, a cellular shade, a drapery, a Roman shade, a Venetian blind, a Persian blind, a pleated blind, a tensioned roller shade systems, an electrochromic or smart window, and/or other suitable daylight control device.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, a controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of a heating, ventilation, and air conditioning (HVAC) system; an air conditioner; a compressor; an electric baseboard heater controller; a controllable damper; a variable air volume controller; a fresh air intake controller; a ventilation controller; hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller.

The load control system 100 may comprise one or more input devices, e.g., such as a wired keypad device 150, a battery-powered remote control device 152, an occupancy sensor 154, a daylight sensor 156, and/or a radio window sensor 158. The wired keypad device 150 may be configured to transmit digital messages to the system controller 110 via the digital communication link 104 in response to an actuation of one or more buttons of the wired keypad device. The battery-powered remote control device 152, the occupancy sensor 154, the daylight sensor 156, and/or the radio window sensor 158 may be wireless control devices (e.g., RF transmitters) configured to transmit digital messages to the system controller 110 via the RF signals 106 (e.g., directly to the system controller). For example, the battery-powered remote control device 152 may be configured to transmit digital messages to the system controller 110 via the RF signals 106 in response to an actuation of one or more buttons of the battery-powered remote control device 152. The occupancy sensor 154 may be configured to transmit digital messages to the system controller 110 via the RF signals 106 in response to detection of occupancy and/or vacancy conditions in the space in which the load control system 100 is installed. The daylight sensor 156 may be configured to transmit digital messages to the system controller 110 via the RF signals 106 in response to detection of different amounts of natural daylight intensity. The radio window sensor 158 may be configured to transmit digital messages to the system controller 110 via the RF signals 106 in response to detection of an exterior daylight intensity coming from outside the space in which the load control system 100 is installed. The system controller 110 may be configured to transmit one or more digital messages to the load control devices (e.g., the dimmer switch 120, the LED drivers 130, and/or motorized window treatments 140) in response to the received digital messages, e.g., from the wired keypad device 150, the battery-powered remote control device 152, the occupancy sensor 154, the daylight sensor 156, and/or the radio window sensor 158. While the system controller 110 may receive digital messages from the input devices and/or transmit digital messages to the load control devices for controlling an electrical load, the input devices may communicate directly with the load control devices for controlling the electrical load.

The load control system 100 may comprise a wireless adapter device 160 that may be coupled to the digital communication link 104. The wireless adapter device 160 may be configured to receive the RF signals 106. The wireless adapter device 160 may be configured to transmit a digital message to the system controller 110 via the digital communication link 104 in response to a digital message received from one of the wireless control devices via the RF signals 106. For example, the wireless adapter device 160 may re-transmit the digital messages received from the wireless control devices on the digital communication link 104.

The occupancy sensor 154 may be configured to detect occupancy and/or vacancy conditions in the space in which the load control system 100 is installed. The occupancy sensor 154 may transmit digital messages to the system controller 110 via the RF signals 106 in response to detecting the occupancy and/or vacancy conditions. The system controller 110 may be configured to turn one or more of the lighting load 122 and/or the LED light sources 132 on and off in response to receiving an occupied command and a vacant command, respectively. The occupancy sensor 154 may operate as a vacancy sensor, such that the lighting loads are turned off in response to detecting a vacancy condition (e.g., not turned on in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 156 may be configured to measure a total light intensity in the space in which the load control system may be installed. The daylight sensor 156 may transmit digital messages including the measured light intensity to the system controller 110 via the RF signals 106. The digital messages may be used to control an electrical load (e.g., the intensity of lighting load 122, the motorized window treatments 140 for controlling the position of the covering material, the intensity of the LED light sources 132) via one or more control load control devices (e.g., the dimmer switch 120, the electronic drive unit 142, the LED driver 130). Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The radio window sensor 158 may be configured to measure an exterior light intensity coming from outside the space in which the load control system 100 is installed. The radio window sensor 158 may be mounted on a façade of a building, such as the exterior or interior of a window, to measure the exterior natural light intensity depending upon the location of the sun in sky. The radio window sensor 158 may detect when direct sunlight is directly shining into the radio window sensor 158, is reflected onto the radio window sensor 158, or is blocked by external means, such as clouds or a building, and may send digital messages indicating the measured light intensity. The radio window sensor 158 may transmit digital messages including the measured light intensity to the system controller 110 via the RF signals 106. The digital messages may be used to control an electrical load (e.g., the intensity of lighting load 122, the motorized window treatments 140 for controlling the position of the covering material, the intensity of the LED light sources 132) via one or more control load control devices (e.g., the dimmer switch 120, the electronic drive unit 142, the LED driver 130). The radio window sensor 158 may also be referred to as a shadow sensor, a cloudy-day sensor, a sun sensor, or another sensor that may measure an external light intensity coming from outside of a space.

The load control system 100 may comprise other types of input device, such as, for example, temperature sensors; humidity sensors; radiometers; pressure sensors; smoke detectors; carbon monoxide detectors; air-quality sensors; motion sensors; security sensors; proximity sensors; fixture sensors; partition sensors; keypads; kinetic or solar-powered remote controls; key fobs; cell phones; smart phones; tablets; personal digital assistants; personal computers; laptops; timeclocks; audio-visual controls; safety devices; power monitoring devices (such as power meters, energy meters, utility submeters, utility rate meters); central control transmitters; residential, commercial, or industrial controllers; or any combination of these input devices. These input devices may also transmit digital messages to the system controller 110 via the RF signals 106. The digital messages may be used to control an electrical load (e.g., the intensity of lighting load 122, the motorized window treatments 140 for controlling the position of the covering material, the intensity of the LED light sources 132) via one or more control load control devices (e.g., the dimmer switch 120, the electronic drive unit 142, the LED driver 130).

The system controller 110 may be operable to be coupled to a network 170, such as a wireless or wired local area network (LAN) via a network communication bus 162 (e.g., an Ethernet communication link), e.g., for access to the Internet. The system controller 110 may be connected to a network switch 164 (e.g., a router or Ethernet switch) via the network communication bus 162 for allowing the system controller 110 to communicate with other system controllers. The system controller may be configured to communicate via the network 170 with a remote computing device 168 for controlling other electrical loads. The remote computing device 168 may be a network server or other computing device capable of storing instructions or other information for controlling one or more electrical loads in the load control system 100. The system controller may be wirelessly connected to the network 170, e.g., using Wi-Fi technology. The system controller 110 may also be configured to communicate via the network 170 with one or more network devices, such as the network device 166 for example. The network device 166 may be a smart phone (e.g., an iPhone® smart phone, an Android® smart phone, a Windows® smart phone, or a Blackberry® smart phone), a personal computer, a laptop, a tablet device, (e.g., an iPad® hand-held computing device), a Wi-Fi or wireless-communication-capable television, and/or any other suitable wireless or wired communication device (e.g., an Internet-Protocol-enabled device). The network device 166 may be operable to transmit digital messages to and/or receive digital messages from the system controller 110 and/or the remote computing device 168 in one or more Internet Protocol packets. The network device 166 may be operable to transmit digital messages directly to and/or receive digital messages directly from the load control devices and/or the input devices. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The system controller 110 may be configured to automatically control the load control devices (e.g., the dimmer switch 120, the LED drivers 130, and/or the motorized window treatments 140). For example, the system controller 110 may control the load control devices according to a timeclock schedule, which may be stored in a memory in the system controller 110, and/or based on the sensed daylight intensity that may indicate the amount of daylight in one or more spaces in which the load control system 100 is installed. The system controller 110, the may store instructions for performing the automated control of the load control devices locally, or may receive similar instructions from one or more other computing devices, such as the network device 166 and/or the remote computing device 168 for example. The control of the lighting loads may be coordinated with the control of motorized window treatments 140 to save energy and/or improve the comfort of the occupants of the space in which the load control system 100 is installed. For example, motorized window treatments 140 may be controlled to allow more daylight into the space in which the load control system may be installed, which may allow the amount of energy provided to the lighting loads 122, 132 to be reduced. The motorized window treatments 140 may also control the amount of glare within the space in which the load control system 100 is installed to provide comfort to occupants. Examples of a load control systems for automatically controlling one or more motorized window treatments 140 is described in greater detail in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, and commonly-assigned U.S. Pat. No. 8,508,169, issued Aug. 13, 2013, entitled METHOD OF AUTOMATICALLY CONTROLLING A MOTORIZED WINDOW TREATMENT WHILE MINIMIZING OCCUPANT DISTRACTIONS, the entire disclosures of which are hereby incorporated by reference.

The operation of the load control system 100 may be programmed, configured, and/or controlled using the network device 166 or other network device. The network device 166 may execute a graphical user interface (GUI) configuration software for allowing a user to program how the load control system 100 may operate. The configuration software may generate load control information (e.g., a load control database) that defines the operation and/or performance of the load control system 100. For example, the load control information may include information regarding the different load control devices of the load control system (e.g., the dimmer switch 120, the LED drivers 130, and/or the motorized window treatments 140). The load control information may include information regarding associations between the load control devices and the input devices (e.g., the wired keypad device 150, the battery-powered remote control device 152, the occupancy sensor 154, the daylight sensor 156, and/or the radio window sensor 158), and/or how the load control devices may respond to input received from the input devices. Examples of configuration procedures for load control systems are described in greater detail in commonly-assigned U.S. Pat. No. 7,391,297, issued Jun. 24, 2008, entitled HANDHELD PROGRAMMER FOR LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosures of which are hereby incorporated by reference.

Figure 2A:
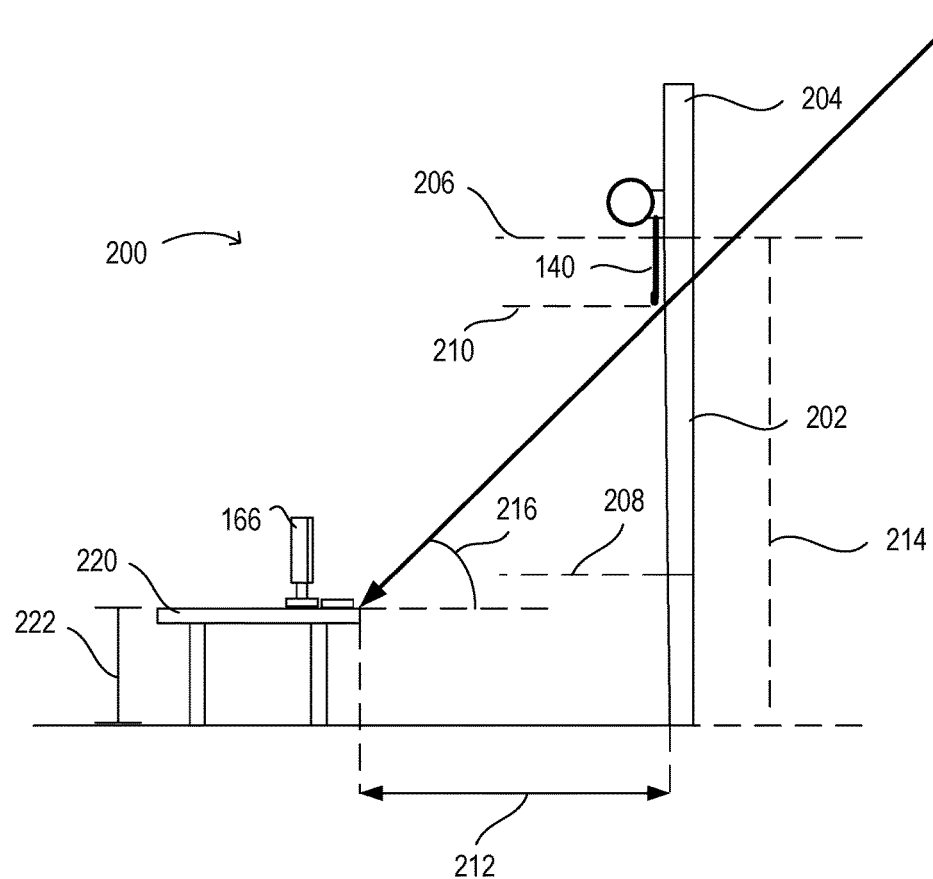
FIGS. 2A and 2B depict an example of a space in which motorized window treatments may be used to control the amount of daylight.
Figure 2B:
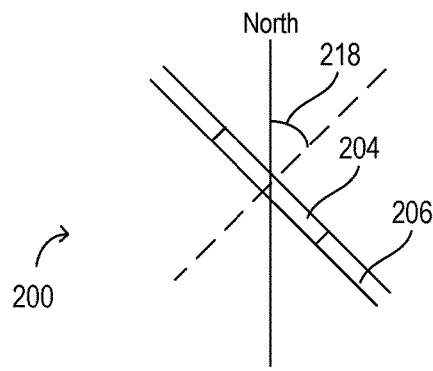

The load control system 100, or portions thereof, may be used for automated and/or manual control of the motorized window treatments 140 to increase or decrease the amount of natural daylight in a space, such as the same building; the same floor or floors in a building; the same room or rooms in a building; a portion of a room in a building; or a space or spaces sharing the same façade of a building for example. FIGS. 2A and 2B illustrate an example of a space 200 in which the motorized window treatments 140 may be used to control the amount of daylight that may enter the space 200 through the window 202. The space 200 may be a room or a portion of a room or rooms in a building that share a façade 204. The covering material of the motorized window treatments 140 may be set to various positions for allowing different amounts of daylight into the space 200 through the window 202.

The amount of daylight entering the space 200 may be controlled to conserve the amount of energy that may be provided to other load control devices in the space 200. If the space 200 includes lighting loads (not shown) for lighting the space 200, the amount of daylight entering the space 200 may be controlled to conserve the amount of power provided to the lighting loads. The amount of daylight entering the space may be controlled to conserve the amount of energy that may be provided for heating and/or cooling the space 200. For example, the amount of power provided to an HVAC system (not shown) may be reduced by increasing the amount of daylight allowed into the space to naturally increase the temperature of the space 200, or by blocking the daylight from entering the space to naturally decrease the temperature.

Where the covering material of the motorized window treatments 140 is a roller shade, the shades may be set to any position between a fully-open shade position 206 and a fully-closed shade position 208. The fully-open shade position 206 may allow a maximum amount of daylight (e.g., 99% or 100%) into the space 200 through the window 202. The fully-closed shade position 208 may allow a minimum amount of daylight (e.g., 1% or 0%) into the load control environment through the window 202. The shades may be set to a visor position 210. The visor position 210 may be the highest position to which the shades may be controlled during the automated control of the motorized window treatments 140. The visor position 210 may be lower than or equal to the fully-open position 206.

The motorized window treatments 140 may be used to limit the daylight to a defined area in the space 200. The penetration of the daylight may be limited to a maximum sunlight penetration distance 212 into the space 200 from the window 202 and/or the façade 204 in which the window 202 may be installed. The amount of daylight entering the space 200 may be controlled to limit the amount of glare that may be caused by the daylight directly entering the space. For example, the amount of daylight may be maximized to reduce the amount of power provided to load control devices, but may also be limited to an area that prevents glare from bothering occupants in the space.

The sunlight penetration distance may be the distance from the window 202 and/or the façade 204 at which the daylight may shine directly into the space 200. The sunlight penetration distance may be a function of a height of the window 214 and an angle of the façade 218 (as shown in FIG. 2B) with respect to true north, as well as a solar elevation angle 216 and a solar azimuth angle, which may define the position of the sun in the sky. The solar elevation angle 216 and the solar azimuth angle may be functions of the present date and time, and/or the position (e.g., the longitude and latitude) of the building in which the space 200 is located. The solar elevation angle 216 may be the angle between a line directed towards the sun and a line directed towards the horizon at the position of the building in which the space 200 is located. The solar elevation angle 216 may be the angle of incidence of the daylight on a horizontal surface. The solar azimuth angle may be the angle formed by the line from an observer to true north and the line from the observer to the sun projected on the ground.

The maximum sunlight penetration distance 212 may be a distance to a work station 220, such as a table, a network device 166 location, or other work space. The amount of daylight entering the space 200 may be limited to prevent glare on the surface of the work station 220 or the network device 166. To prevent the glare on the surface of the work station 220, a height 222 of the work station 220 may be considered. For example, the sunlight penetration distance may be limited to a distance that prevents the daylight from reaching the surface of the work station 220 at the height 222 (e.g., the maximum sunlight penetration distance 212). The distance of the daylight penetration to the surface of the work station 220 may be determined by considering a triangle formed by the length of the deepest penetrating ray of the daylight (which may be parallel to the path of the ray), the difference between the height of the window 214 and the height 222 of the work station 220, and the maximum sunlight penetration distance 212 between the work station 220 and the window 202 or the wall of the façade 204 (e.g., the sunlight penetration distance).

One or more of the motorized window treatments 140 may be controlled based on motorized window treatment control parameters. The motorized window treatment control parameters may include automated control parameters for performing automated control of the motorized window treatments 140 during an automated control state. The motorized window treatment control parameters may also include override parameters for overriding the automated control of the motorized window treatments 140 and/or controlling the motorized window treatments 140 during an override state. The motorized window treatment control parameters may be stored at and/or used by the system controller 110, the network device 166, and/or the remote computing device 168 for controlling of the motorized window treatments 140 during different control states. The motorized window treatment control parameters may be different for different groups of motorized window treatments. For example, the motorized window treatments on each façade of the building may be controlled according to different automated control parameters.

The automated control parameters for the space 200 may be used to adjust the shade position of one or more motorized window treatments 140 over the course of the day. The automated control parameters may include the height 222 of the work station 220 (e.g., thirty inches), the maximum sunlight penetration distance 212 (e.g., twenty-four inches), a minimum amount of time between movements of the covering material for the motorized window treatment 140 (e.g., thirty minutes), a visor position 210 for the covering material, a facing direction for the façade 204 (e.g., forty-five degrees from due north), shade heights for the motorized window treatment 140 (e.g., the distance of the hembar from the floor when the shade is in the fully-closed position and/or the fully-open position), the start of the day automated control behavior (e.g., behavior at sunrise), and/or the end of the day automated control behavior (e.g., behavior at sunset). The automated control parameters may be used to calculate one or more preset shade positions or any finite point for the shade to travel to throughout the day based on the sun position. The shade heights may be, or may be otherwise determined from, the fully-open position 206 (e.g., one hundred and twenty inches for some shades) and the fully-closed position 208 (e.g., zero inches).

The override parameters may include parameters for controlling the motorized window treatments 140 during various override states. The override states may include a dark override state, a bright override state, a hold visor override state, and/or a manual override state. The dark override state may override the automated control of the motorized window treatment 140 when the amount of daylight in the space 200 is at or below the dark override threshold. The bright override state may override the automated control of the motorized window treatments 140 when the amount of daylight in the space 200 is at or above the bright override threshold. A direct bright override threshold may be used for a façade that is receiving daylight directly. An indirect bright override threshold may be used for a façade that is not receiving daylight directly. The override states may include a manual override state for overriding the automated control of the motorized window treatments by manual control of the motorized window treatment via one or more input devices, e.g., such as a button press or sequence of button presses on the wired keypad device 150 and/or the battery-powered remote control device 152, a timeclock event, and/or control of the motorized window treatment via the network device 166. The hold visor override state may override the automated control of the motorized window treatment 140 when the amount of daylight in the space 200 is at or below a hold visor override threshold. The override parameters may be stored at and/or used by the system controller 110, the network device 166, and/or the remote computing device 168 for overriding the automated control of the motorized window treatments 140.

The start of the day automated control behavior and/or the end of the day automated control behavior may be programmed astronomically based on a time before/after sunrise and sunset, or may be programmed at fixed times of day. The start of day behavior and/or end of day behavior may be to position each shade at a predetermined shade level (e.g., open each shade, close each shade, etc.) or to leave the shades where they are prior to the start of day/end of day control period. In the morning and/or evening there may be a period of time after sunrise or prior to sunset (e.g., when the sun is about fifteen degrees of solar elevation and below) in which the shades may be controlled with a ramping dark override threshold. Because the sun may be low in the sky during morning and/or evening, the overall brightness detected by a sensor may be reduced. During the periods in which the sun is lower in the sky, the sensors may be more sensitive and may determine a cloudy day condition or the presence of a building blocking direct sunlight using less light than during mid-day between the morning and evening. Examples for changing the dark override threshold around sunrise and sunset are described in greater detail in commonly-assigned U.S. Patent App. Pub. No. 2014/0156079, published Jun. 5, 2014, entitled METHOD OF CONTROLLING A MOTORIZED WINDOW TREATMENT, the entire disclosure of which is hereby incorporated by reference.

The override parameters for the dark override state may include an indication of whether the dark override is enabled, a dark override threshold (e.g., 300 foot candles), a dark override shade position (e.g., 100%), a dark override delay time period, and/or a dark override hysteresis (e.g., 100 foot candles). The dark override state may be used to override the automated control of the motorized window treatments 140 when the intensity of the daylight is at or below the dark override threshold. The dark override state may cause the covering material of the motorized window treatments 140 to be opened to the dark override shade position to allow more of the daylight in the space 200. The dark override state may be entered when the daylight level is at or below the dark override threshold for the dark override delay time period, which may be a predetermined period of time (e.g., thirty minutes). The dark override delay time period may prevent the dark override state from being entered each time the daylight level is at or below the dark override threshold for a short period of time (e.g., a short passing of a cloud or the like). The dark override shade position may be maintained for as long as the light level stays at or below the dark override threshold and/or the dark override hysteresis. The dark override hysteresis may indicate a threshold amount the intensity the daylight may rise above the dark override threshold before the automated control of the motorized window treatment may return to the automated control state or otherwise leave the dark override state. The dark override hysteresis may prevent the dark override state from being entered into and exited frequently when the intensity of the daylight is about the same intensity as the dark override threshold, or the intensity of the daylight is otherwise rising slightly above the dark override threshold frequently.

The override parameters for the bright override state may include an indication of whether the bright override is enabled, a bright override threshold (e.g., 5000 foot candles), a bright override shade position (e.g., 0%), a bright override delay time period, and/or a bright override hysteresis (e.g., 1000 foot candles). The bright override state may be used to override the automated control of the motorized window treatments 140 when the intensity of the daylight is at or above the bright override threshold. The bright override state may cause the covering material of the motorized window treatments 140 to be lowered to the bright override shade position to allow less of the daylight in the space 200. The control of the motorized window treatments may return to the automated control state when the daylight level is at or below the bright override threshold and/or the bright override hysteresis for the bright override delay time period, which may be a predetermined period of time (e.g., thirty minutes). The bright override delay time period may prevent the bright override state from being exited each time the daylight level is at or below the bright override threshold for a short period of time (e.g., a short passing of a cloud or the like). The bright override shade position may be maintained for as long as the daylight level stays at or above the bright override threshold and/or the bright override hysteresis. The bright override hysteresis may indicate a threshold amount the intensity of the daylight may fall below the bright override threshold before the automated control of the motorized window treatment may return to the automated control state or otherwise leave the bright override state. The bright override hysteresis may prevent the bright override state from being entered into and exited frequently when the intensity of the daylight is about the same intensity as the bright override threshold, or the intensity of the daylight is otherwise falling slightly below the bright override threshold frequently. The bright override threshold may be different when the motorized window treatments 140 are on a façade that is receiving the daylight directly (e.g., direct bright override threshold) than when the motorized window treatments 140 are on a façade that is receiving the daylight indirectly or that is not receiving the daylight directly (e.g., indirect bright override threshold).

The bright override state may include a direct bright override and/or an indirect bright override. The direct bright override may be used for motorized window treatments that are on a façade that is receiving daylight directly. The indirect bright override may be used for motorized window treatments that are on a façade that is receiving daylight indirectly or that is not receiving direct daylight. The direct bright override and the indirect bright override may have shared and/or respective override parameters. The override parameters for the direct bright override state may include an indication of whether the direct bright override is enabled, a direct bright override threshold (e.g., 5000 foot candles), a direct bright override shade position, a direct bright override delay time period, and/or a direct bright override hysteresis (e.g., 1000 foot candles). The override parameters for the indirect bright override state may include an indication of whether the indirect bright override is enabled, an indirect bright override threshold (e.g., 2500 foot candles), an indirect bright override shade position, an indirect bright override delay time period, and/or an indirect bright override hysteresis (e.g., 500 foot candles). The direct bright override and the indirect bright override may share a bright override shade position (e.g., 0%) and/or a bright override delay time period (e.g., thirty minutes). The direct bright override threshold may be greater (e.g., twice a great, or another multiple greater) than the indirect bright override threshold.

The override parameters for the hold visor override state may include an indication of whether the hold visor override state is enabled, a hold visor threshold (e.g., 1500 foot candles), a visor position (e.g., thirty-five percent closed), a hold visor override delay time period (e.g., thirty minutes), and/or a hold visor override hysteresis (e.g., 300 foot candles). The hold visor override state may be used to position the motorized window treatments to the visor position 210 when the intensity of the daylight is at or below the hold visor override threshold. The hold visor override threshold may be below the bright override threshold and above the dark override threshold. The hold visor override state may cause the covering material of the motorized window treatments 140 to be opened to the visor position 210 (e.g., 80%) to allow more of the daylight in the space 200. For example, the visor position 210 may be utilized when the space 200 is in a position to receive the daylight directly (e.g., at a façade that is directly facing the sun), but the intensity of the daylight is at or below the hold visor override threshold (e.g., due to the daylight being blocked by cloud cover or a building).

The control of the motorized window treatments 140 may return to the automated control state when the daylight level is at or above the hold visor override threshold and/or the hold visor override hysteresis for the hold visor override delay time period, which may be a predetermined period of time. When the hold visor override threshold is between the bright override threshold and the dark override threshold, the control of the motorized window treatments may change to the dark override state when the daylight level is at or below the dark override threshold and/or the hold visor override hysteresis for the hold visor override delay time period, which may be a predetermined period of time. The hold visor override hysteresis may have an upper bound and a lower bound. The hold visor override delay time period may prevent the hold visor override state from being exited each time the daylight level is at or above the hold visor override threshold, or at or below the dark override threshold, for a short period of time. The hold visor override hysteresis may indicate a threshold amount the intensity of the daylight may rise above the upper-bound hold visor override threshold (e.g., 500 foot candles), or fall below the lower-bound visor override threshold (e.g., 100 foot candles), before the control of the motorized window treatment may change to another control state. The hold visor override hysteresis may prevent the hold visor override state from being entered into and exited frequently when the intensity of the daylight is about the same intensity as the hold visor override threshold or the dark override threshold or is entering and exiting the hold visor override state parameters multiple times within the hold visor override delay time period.

A determination may be made as to whether the daylight is being received directly at the space 200 or a façade at which the space 200 may be located. The determination may be based on a facing angle of the façade and/or the real-time position of the sun in the sky. The time of day, the location of the building in which the space 200 may be located, and/or the angle of the façade at which the space 200 may be located may be used to detect whether the space 200, or the façade at which the space may be located, is directly receiving the daylight. The intensity of the light received at the daylight sensor 156 and/or the radio window sensor 158 may be used to determine whether the space 200 is receiving direct daylight.

The manual override state may be caused by an adjustment of the shade position received from one or more input devices, e.g., such as a button press or sequence of button presses on the wired keypad device 150 and/or the battery-powered remote control device 152, a timeclock event, and/or control of the motorized window treatment via the network device 166. The manual adjustment of the position of the covering material for the motorized window treatments 140 may last for a predetermined duration of time. The duration of time maybe calculated from the first manual adjustment or from the last manual adjustment by a user. For example, the manual override state may last for 30 minutes from a user adjustment of the motorized window treatment via a remote control device The motorized window treatments 140 may be included in a group of motorized window treatments. A group of motorized window treatments may include one or more motorized window treatments. Each group of motorized window treatments may be in the same space, such as the same building, the same floor or floors in a building, the same room or rooms in a building, a portion of a room in a building, or a space or spaces sharing the same façade of a building for example. Different groups of motorized window treatments may be controlled according to different motorized window treatment control parameters. For example, the thresholds, shade positions, delay periods, and/or hysteresis for the control states may be different based on the façade of each motorized window treatment group.

Figure 3:
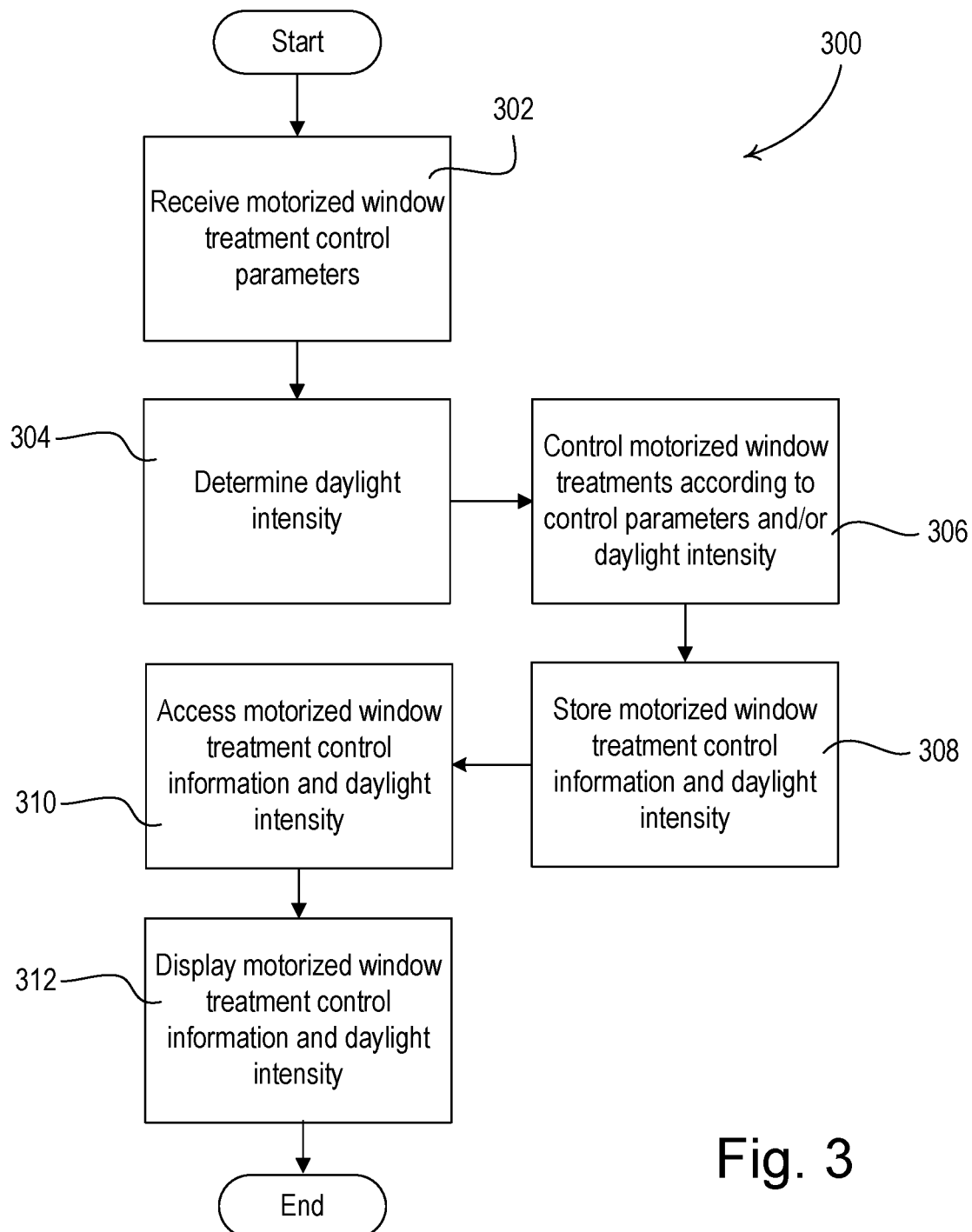
FIG. 3 is a simplified flow diagram illustrating an example method for performing control of motorized window treatments and accessing the control information for display to a user.

FIG. 3 is a simplified flow diagram illustrating an example method 300 for performing control of motorized window treatments and accessing the control information for display to a user. The method 300, or portions thereof, may be performed by the system controller 110, the network device 166, and/or the remote computing device 168 for controlling motorized window treatments, such as the motorized window treatments 140 for example, and accessing the motorized widow treatment control information for that period of time for later access. The method 300 may be performed for one or more groups of motorized window treatments, such as the motorized window treatments 140 for example.

As shown in FIG. 3, motorized window treatment control parameters may be received at 302. The motorized window treatment control parameters may include automated control parameters for controlling the motorized window treatments 140 based on a received daylight intensity at a space. The motorized window treatment control parameters may also include override parameters for controlling the motorized window treatments 140 in various override states that may override the automated control of the motorized window treatments 140. For example, the override states may be entered when the daylight intensity reaches a defined threshold for one of the override states that is stored in the override parameters.

At 304, the daylight intensity may be determined. For example, the daylight intensity may be at the system controller 110, the network device 166, and/or the remote computing device 168 based on the amount of daylight being sensed (e.g., by the daylight sensor 156 and/or the radio window sensor 158), the time of day, the position of the sun, and/or other parameters that may be used to determine the daylight intensity at a space. The determination may include whether the daylight is being received directly or indirectly at a space based on the direction of the façade, the position of the sun, and/or the time of day.

The motorized window treatments 140 may be controlled at 306 according to the motorized window treatment control parameters and/or the daylight intensity. In an automated control state, the automated control parameters and the daylight intensity may be used to determine a position of the covering material for the motorized window treatments 140. In an override state, the override parameters and the daylight intensity may be used to determine a position of the covering material for the motorized window treatments 140. In an override state that is entered based upon inputs other than the daylight intensity (e.g., the manual override state), the daylight intensity may not be used for control, but may still be tracked for the time period in which the motorized window treatments 140 are controlled.

The motorized window treatment control information and/or the daylight intensity may be stored at 308 for access at 310. The motorized window treatment control information and/or the daylight intensity may be accessed at 310 based on a user request for such information (e.g., at the network device 166 and/or the remote computing device 168). The user request may indicate a period of time and/or one or more motorized window treatments for which the motorized window treatment control information is desired. The indication of the one or more motorized window treatments may include a location and/or an identification of a group of motorized window treatments. The motorized window treatment control information may include the control state (e.g., automated control state and/or override states) for controlling the motorized window treatment and/or the position of the covering material for the indicated period of time. The motorized window treatment control information and/or the daylight intensity may be displayed at 312. The motorized window treatment control information and/or the daylight intensity may be displayed for the indicated period of time. Solar angle information (e.g., solar altitude angle and/or an indication of whether the sun is on a façade) may also be determined and displayed for the indicated period of time.

Figure 4A:
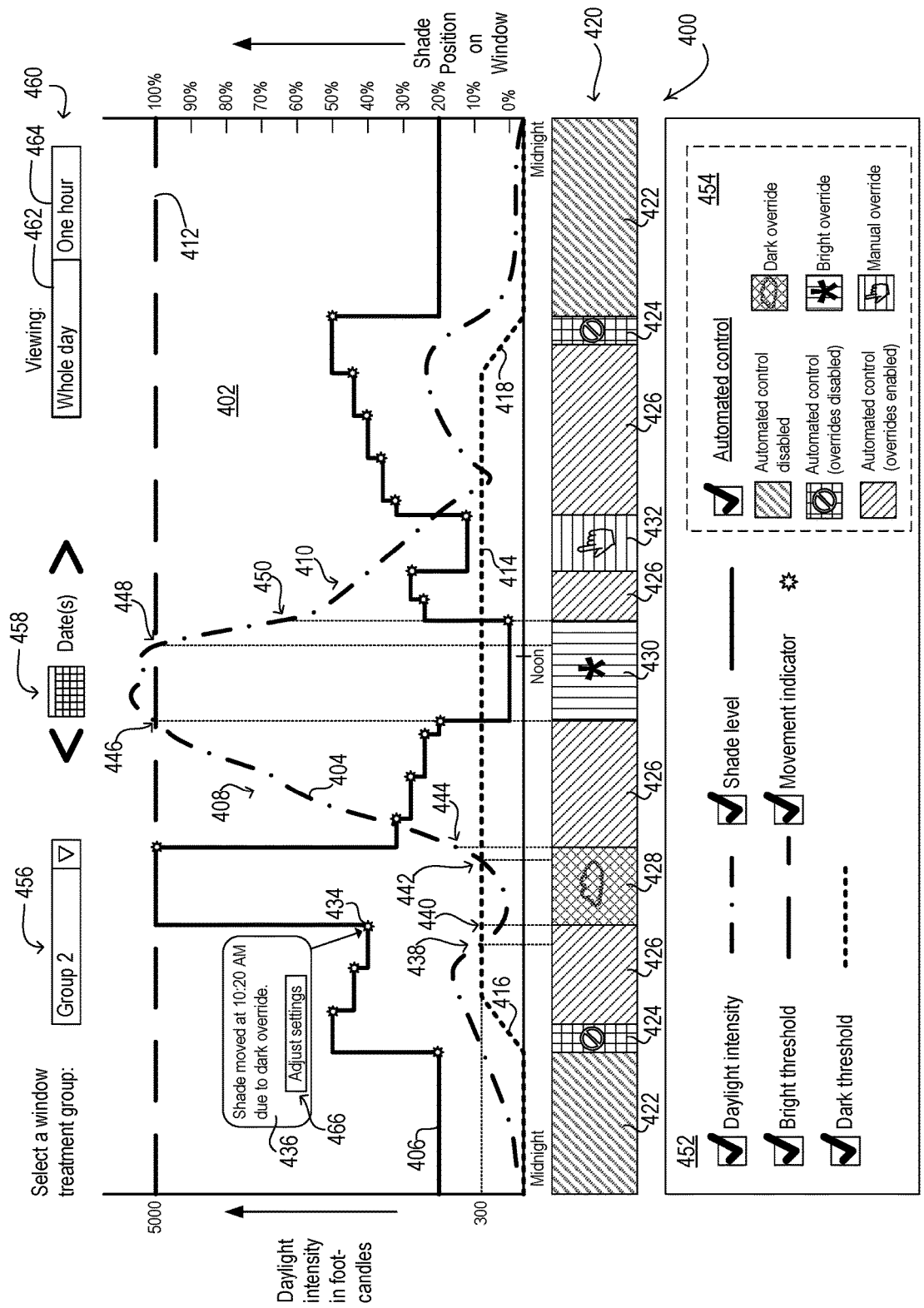
FIGS. 4A and 4B depict an example user interface for displaying motorized window treatment control information.
Figure 4B:
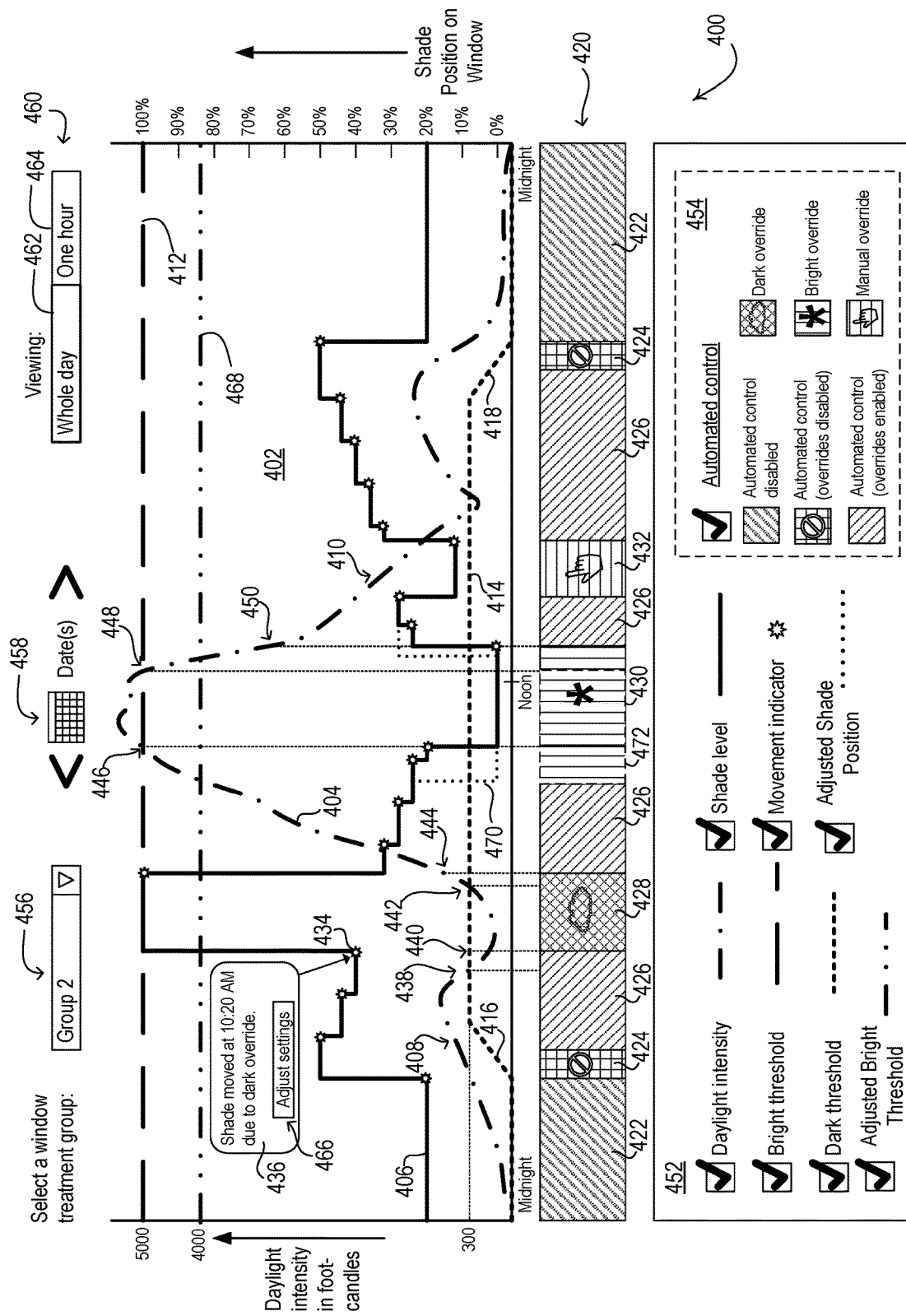

FIGS. 4A and 4B depict an example user interface 400 for displaying motorized window treatment control information to a user. As shown in FIG. 4A, the user interface 400 may include a graph 402 that may indicate a daylight intensity 404. The daylight intensity 404 may be indicated in foot candles or any other measurement indicating a daylight intensity. The daylight intensity 404 may be indicated in a predefined pattern, color, symbol, or other indicator to differentiate from other information identified in the graph 402.

The daylight intensity 404 may be based on the amount of daylight being received at a space or on a façade. The daylight intensity 404 may be sensed using one or more sensors, such as the daylight sensor 156 and/or the radio window sensor 158 shown in FIG. 1. While one daylight intensity 404 may be shown in the graph 402, the daylight intensity 404 may be determined from multiple sensors. The sensors may be included in predetermined groups (e.g., groups on a façade). The sensors may be included in groups that are determined dynamically. Sensors may be dynamically grouped based on their sensed light level and their proximity to one another. For example, if sensors within a predetermined distance of one another are sensing a same daylight intensity or a daylight intensity within a predetermined threshold of one another, the sensors may be included in the same sensor group.

The daylight intensity 404 may be used to control one or more shades (e.g., a group of shades). A single sensor may sense the daylight intensity 404 that may be used to control one or more shades in a group of shades. When multiple sensors are used to control one or more shades in a group of shades, the daylight intensity 404 may reflect the highest sensor value (e.g., the highest sensor value of a predetermined or dynamically determined group of sensors). In other examples, the daylight intensity 404 may be based on an average or a weighted average of the data collected from each sensor. The information from one or more sensors may be provided in the user interface 400. The daylight intensity 404 may be based on the amount of daylight being sensed, the time of day, the position of the sun, and/or other parameters that may be used to determine the daylight intensity at a space.

The graph 402 may indicate motorized window treatment control information for one or more motorized window treatments in a space, such as a building, a floor or floors in a building, a room or rooms in a building, a portion of a room in a building, or a space or spaces sharing the same façade of a building for example. The motorized window treatment control information may include a shade position 406 and/or a control state associated with the shade position 406. The daylight intensity 404 and the shade position 406 may be indicated with different colors, patterns, symbols, and/or other indicators for differentiation. The shade position 406 may be indicated by a percentage of the window that may be covered by a window shade. While the graph 402 illustrates a shade position 406, any indication of the amount of daylight allowed by a covering material of a motorized window treatment may be provided, such as a hem bar position or any other indicator of the amount of a window that may be covered by a covering material, for example.

The shade position 406 may be controlled based on the daylight intensity 404 at a corresponding time. The shade position 406 may be adjusted when the daylight intensity 404 is at different levels to control the amount of daylight entering a space. As shown at 408, as the daylight intensity 404 may increase for a space that is receiving daylight (e.g., based on the time of day, cloud cover, etc.) the shade position 406 may be lowered or set at a position allowing less daylight into the space. The shade position 406 may be adjusted based on the slope or the rate of change of the daylight intensity 404 in the graph 402. The shade position 406 may increase or set at a position allowing less daylight into the space as the daylight intensity 404 decreases, as shown at 410. Though the daylight intensity 404 may increase or decrease, the shade position 406 may respectively increase or decrease, as the daylight intensity 404 may be based on the total daylight intensity level 404 and/or the amount of daylight allowed into a space. The shade position 406 may have a greater amount of change or may change more frequently when the slope of the daylight intensity 404 is greater. The frequency of change in the shade position 406 may also be considered to avoid moving the shade more than a predetermined amount over a period of time.

The shade position 406 may be communicated from the motorized window treatments, such as the motorized window treatments 140 for example, or otherwise determined from information communicated from the motorized window treatments 140. The system controller 110, the network device 166, and/or the remote computing device 168 may use the communications from the motorized window treatments 140 to control the shade position 406 and/or display the shade position 406 to a user.

The graph 402 may include various types of motorized window treatment control parameters. For example, the graph 402 may include one or more thresholds that may be used for controlling the shade position 406. The graph 402 may include a bright override threshold 412 and/or a dark override threshold 414. The bright override threshold 412 and the dark override threshold 414 may be indicated with different colors, patterns, and/or symbols from each other for differentiation. The colors, patterns, and/or symbols of the bright override threshold 412 and the dark override threshold 414 may also be different from the daylight intensity 404 and the shade position 406. The bright override threshold 412 and/or the dark override threshold 414 may be set by a user or may be a predetermined value. The graph 402 may indicate other motorized window treatment control parameters, such as the bright override delay time period, the bright override hysteresis, the dark override delay time period, the dark override hysteresis, the hold visor override threshold, the hold visor override delay time period, the hold visor override hysteresis, and/or the like.

The shade position 406 may be adjusted using the bright override threshold 412 and/or the dark override threshold 414. As shown in graph 402, the shade position 406 may be increased when the daylight intensity 404 is at the dark override threshold 414 or lower. The shade position 406 may be adjusted to prevent the daylight intensity 404 from reaching the dark override threshold 414 or lower. As shown in graph 402, the shade position 406 may be decreased when the daylight intensity 404 is at the bright override threshold 412 or higher. The shade position 406 may be decreased to prevent the daylight intensity 404 from reaching the bright override threshold 412 or higher.

The dark override threshold 414 may include a morning ramping period 416 and/or an evening ramping period 418. The morning ramping period 416 may run from a low threshold (e.g., zero daylight) to the dark override threshold 414 over a period of time. The evening ramping period 418 may run from the dark override threshold 414 to the low threshold (e.g., zero daylight) over a period of time. The morning ramping period 416 and the evening ramping period 418 may track the rise and fall of the sun during the morning and evening, respectively. The morning ramping period 416 and/or the evening ramping period 418 may change based on the date and/or time of year, or may be set to a predefined ramping period. The morning ramping period 416 and/or the evening ramping period 418 may be configured to have a greater or lesser slope. The configuration of the morning ramping period 416 and/or the evening ramping period 418 may be based on user input. A user may view a ramping profile that may be provided based on the surroundings of the space. A more dense environment, such as a city environment, may be given less of a slope than a less dense environment, such as a suburban or rural area. The gradient of the slope may be increased or decreased a predetermined amount to fit the environment.

The user interface 400 may include a system state indicator pane 420 that may track the control state for the motorized window treatments 140. Where the motorized window treatments 140 are controlled by the system controller 110, the network device 166, and/or the remote computing device 168, the system state indicator pane 420 may track the control state of the device that is controlling the motorized window treatments 140. The system state indicator pane 420 may indicate the state of the motorized window treatments 140 over a period of time. For example, the system state indicator pane 420 may follow the time axis of the graph 402 and/or may indicate the state of the motorized window treatments 140 over different periods of time represented in the graph 402. The system state indicator pane 420 may be on the top or bottom of the graph 402 to track the time axis. The various states that are illustrated in FIG. 4A include the automated control disabled state 422, the override disabled state 424, the automated control state 426, the dark override state 428, the bright override state 430, and/or the manual override state 432, though other states may be implemented, such as an occupied/unoccupied state or the hold visor override state for example. Each state may have a different color, pattern, and/or symbol in the system state indicator pane 420 to differentiate the states.

The automated control state 426 may indicate when the motorized window treatments 140 are automatically controlled according to an automated control function. The automated control of the motorized window treatments 140 may be based on the automated control parameters and/or the daylight intensity 404. The automated control state 426 may be entered during predetermined periods of time, such as during daylight hours for example. The automated control state 426 may be entered when a predefined amount of daylight is sensed. For example, the automated control state 426 may be entered when the daylight intensity 404 is at or above the dark override threshold 414. The automated control state 426 may be maintained until being overridden by another control state or until disabled.

The automated control disabled state 422 may indicate when the automated control of the motorized window treatments 140 is disabled. The automated control disabled state 422 may be entered at the end of the day or the night time and may cause the shade position 406 to be adjusted to an end of day or nighttime position. The end of day or nighttime position may be configured by a user. During the automated control disabled state 422, the motorized window treatments 140 may be manually controlled. For example, during the automated control disabled state 422, an occupant or another user may adjust one or more of the motorized window treatments 140 via one or more input devices, e.g., such as a button press or sequence of button presses on the wired keypad device 150 and/or the battery-powered remote control device 152, a timeclock event, and/or control of the motorized window treatment via the network device 166. The automated control disabled state 422 may be entered during predetermined periods of time, such as before and/or after daylight hours for example. The automated control disabled state 422 may be entered when a predefined amount of daylight is sensed. For example, the automated control disabled state 422 may be entered when the daylight intensity 404 is at or below a threshold, such as the dark override threshold 414 or another low threshold that may be lower than the dark override threshold 414. The automated control disabled state 422 may be entered before the morning ramping period 416 and/or after the evening ramping period 418.

The dark override state 428 may indicate an override of the automated control of the motorized window treatments 140. The dark override state 428 may be entered during the automated control of the motorized window treatments 140 when the daylight intensity 404 is at or below the dark override threshold 414 for the dark override delay time. In another example, the dark override state 428 may be entered to prevent the daylight intensity 404 from reaching the dark override threshold 414 or from going below the dark override threshold 414. During the dark override state 428, the shade position 406 may be raised to increase the daylight intensity 404 and allow more daylight into the space in which the lighting control system 100 is installed. The motorized window treatments 140 may be adjusted to a predetermined shade position 406 or the shade position 406 may be raised a predetermined amount during the dark override state 428. The motorized window treatments 140 may raise the shade position 406 based on the daylight intensity 404 to allow the daylight intensity 404 to increase to a predetermined amount (e.g., at or above the dark override threshold 414) or to increase for a predetermined period of time. The dark override state 428 may be entered into for predetermined period of time or until the daylight intensity 404 reaches a predetermined threshold.

The bright override state 430 may indicate an override of the automated control of the motorized window treatments 140. The bright override state 430 may be entered during the automated control of the motorized window treatments 140 when the daylight intensity 404 is at or above the bright override threshold 412. In another example, the bright override state 430 may be entered to prevent the daylight intensity 404 from reaching the bright override threshold 412 or from going above the bright override threshold 412. During the bright override state 430, the shade position 406 may be lowered to lower the daylight intensity 404 and allow less daylight or daylight glare into the space in which the lighting control system 100 is installed. The shade position 406 may be lowered to a predetermined position or the shade position 406 may be lowered a predetermined amount during the bright override state 430. The shade position 406 may be lowered based on the daylight intensity 404 to allow the daylight intensity 404 to decrease to a predetermined amount (e.g., at or below the bright override threshold 412) or to decrease for a predetermined period of time. The bright override state 430 may be entered into for predetermined period of time or until the daylight intensity 404 reaches a predetermined threshold.

The manual override state 432 may indicate an override of the automated control of the motorized window treatments 140. The manual override state 432 may be entered during the automated control of the motorized window treatments 140 when an occupant or other user manually changes the shade position 406 from the shade position 406 in the automated control state 426. The manual override state 432 may be entered when a user raises or lowers the shade position 406 via one or more input devices, e.g., such as a button press or sequence of button presses on the wired keypad device 150 and/or the battery-powered remote control device 152, a timeclock event, and/or control of the motorized window treatment via the network device 166. The manual override state 432 may be entered into for a manual override timeout period. The manual override timeout period may be a predetermined period of time (e.g., thirty minutes). In another example, the manual override state may stay enabled until the user activates the automated control state 426 or another control state.

The override disabled state 424 may indicate a period of time in which one or more overrides of the automated control state 426 may be disabled. The override disabled state 424 may be entered during predefined periods of the automated control state 426 to disable override of the automated control state 426. The override disabled state 424 may be entered at the beginning and/or end of the automated control state 426 to allow the shade position 406 and/or the daylight intensity 404 to reach a predefined level while starting and/or ending the automated control state 426. For example, the override disabled state 424 may be entered at the beginning of the morning ramping period 416 (e.g., at a predetermined portion of the ramping period) and/or the end of the evening ramping period 418 (e.g., at a predetermined portion of the ramping period). The override disabled state 424 may prevent the dark override state 428 from being entered when the sun is rising in the morning or falling in the evening. The morning and evening may include predetermined periods of time before and after noon, respectively. The morning and evening time period may also, or alternatively, be indicated by the solar elevation angle. When the solar elevation angle is below a predetermined threshold (e.g., fifteen degrees) before noon, it may be morning. When the solar elevation angle is below a predetermined threshold (e.g., fifteen degrees) after noon, it may be evening. The override disabled state 424 may be entered into for a predetermined period of time or until the shade position 406 or the daylight intensity 404 reach a predetermined level.

The user interface 400 may indicate the reasons for which the shade position 406 has been moved. For example, as shown in FIG. 4A, the graph 402 may include shade movement indicators, such as shade movement indicator 434, that may indicate respective movements of the shade position 406 and/or the time at which the movement occurred. The shade movement indicators may also, or alternatively, indicate a change in system state that may cause a movement of the shade position 406. The shade movement indicators may indicate whether the shade position 404 was raised or lowered, such as via an up or down icon or a respective color indicating that the shade position 406 was raised or lowered. Each of the movement indicators may be given a color or symbol that may correspond to the reason or state that caused the change in the shade position 406.

As shown in FIG. 4A, the movement indicators may correspond to a change in shade position 406 due to a change in a system state. Each movement indicator may correspond to a change in the system state that is indicated in the system state indicator pane 420. In another example, the movement indicator may correspond to one or more predefined system states to indicate those predefines states to a user. The control parameters for the system states may be user-defined.

The movement indicators may be interactive to display information to a user about the change in shade position 406. The reason for the change in shade position 406 and/or the time of the change may be provided to a user upon selection of a movement indicator, such as when the user taps on a movement indicator, hovers the mouse icon over the movement indicator, or performs another selection of the movement indicator. For example, upon selection or hovering a mouse icon over the movement indicator 434, the user interface 400 may display detail information 436 that may indicate that the shade position 406 was moved, the time at which the shade position 406 was moved, the reason the shade position 406 was moved, and/or the system state to which the system moved. The detail information 436 may include a button 466 that may allow the user to adjust system settings, such as the motorized window treatment control parameters, for example. The button 466 may link to another interface to allow adjustments to user settings or that may prompt the user for information that indicates the user's problems with the system.

The graph 402 and the system state indicator pane 420 may illustrate other motorized window treatment control parameters that may be implemented in the load control system. As shown in FIG. 4A, the daylight intensity may cross the dark override threshold 414 at 438 and the dark override state 428 may be entered at 440 after the dark override delay period expires. The dark override delay period may expire after the daylight intensity 404 is at or below the dark override threshold 414 for a predetermined period of time. The dark override delay period may prevent the dark override state 428 from being entered when the daylight intensity goes below the dark override threshold 414 for a period of time that is less than the dark override delay period.

The dark override state 428 may be exited after the dark override hysteresis is reached. The daylight intensity 404 may be raised above the dark override threshold 414 at 442 and the dark override state 428 may be exited at 444 after the daylight intensity 404 reaches the dark override hysteresis. The dark override hysteresis may be a predetermined amount above the dark override threshold 414. The dark override hysteresis may prevent the dark override state 428 from being exited when the daylight intensity 404 goes above the dark override threshold 414 by less than the dark override hysteresis.

As the level of brightness in a space may be more noticeable or bothersome to a user, the bright override state 430 may be entered at 446 when the bright override threshold 412 may be crossed by the daylight intensity 404. The bright override threshold 412 may also implement a bright override delay period (not shown). The daylight intensity 404 may be lowered to or below the bright override threshold 412 at 448 and the bright override state 430 may be exited at 450 after the bright override hysteresis is reached. The bright override hysteresis may be a predetermined amount below the bright override threshold 412. The bright override hysteresis may prevent the bright override state 430 from being exited when the daylight intensity 404 goes below the bright override threshold 412 by less than the bright override hysteresis.

The user interface 400 may include a legend 452. The legend 452 may define the information that may be provided in the graph 402 and/or the system state indicator pane 420. For example, the legend 452 may define the representations in the graph 402 that indicate the daylight intensity 404, the motorized window treatment control information (e.g., the shade position 406 and/or the control states), the motorized window treatment control parameters (e.g., the bright override threshold 412 and/or the dark override threshold 414), and/or the movement indicators. The representations may be defined by different colors, patterns, line weights, symbols and/or other representations that may be used to distinguish the information in the graph 402.

The display of the information in the graph 402 may be enabled/disabled. The legend 452 may be used to enable/disable the daylight intensity 404, the motorized window treatment control information (e.g., the shade position 406 and/or the control states), the motorized window treatment control parameters (e.g., the bright override threshold 412 and/or the dark override threshold 414), and/or the movement indicators. The system state information may be indicated in a separate section 454, which may be a subsection of the legend 452.

The graph 402 may provide information for various numbers of motorized window treatments and/or over different periods of time. The graph 402 may display information for one or more motorized window treatment groups 456. A motorized window treatment group 456 may include one or more motorized window treatments. The motorized window treatment group 456 may include motorized window treatments located in the same building, the same floor or floors in a building, the same room or rooms in a building, a portion of a room in a building, or a space or spaces sharing the same façade of a building, for example.

The information in the graph 402 may be displayed over one or more timeframes. The timeframes may include one or more dates 458 that may be selected by a user. The graph 402 may provide information over selected time periods 460 within the one or more dates 458. The time periods 460 may include the range of time 462 and/or the event increments 464 for which information may be provided. For example, the range of time 462 may allow for viewing daily information in a twenty-four hour view, information from sunrise to sunset, or information in hour or minute increments. The event increments 464 may indicate the increments of time for which the changes to the shade position 406 may be displayed. Events may be displayed to the closest minute, the closest hour, or the closest day. The motorized window treatment group 456, the date(s) 458, and/or the time periods 460 may be user selected or may be predetermined. Using the motorized window treatment group 456, the date(s) 458, and/or the time periods 460, users may go back in time to view and/or track control information for one or more motorized window treatments.

The user interface 400 allows for tracking the system health of the motorized window treatment control information. The more often motorized window shades in a space are manually overridden, the less healthy the space may be. The motorized window treatment control information may be accessed, by the system controller 110, the network device 166, and/or the remote computing device 168 for example, to automatically adjust the motorized window control parameters based on the manual overrides. For example, if the number of manual overrides in a predefined time period exceed a threshold, an adjustment of one or more motorized window control parameters may be recommended or automatically implemented. The adjustments may be to the motorized window control parameters that are causing the manual adjustment, such as a low threshold that may cause a user to manually increase the shade level 406, for example. Adjustments may similarly be recommended or performed for other motorized window control parameters based on a number of other overrides that occur within a predefined period of time. For example, the bright override threshold 412 or the dark override threshold 414 may be adjusted to compensate for manual adjustments. The number of manual overrides and/or the health of the system may be provided to the user in a report. The report may be provided to the user automatically as an alert or upon request.

Adjustments to the motorized window treatment control may be made in user interface 400. The adjustments may be received, e.g., by the system controller 110, the network device 166, and/or the remote computing device 168, and may be implemented for controlling the motorized window treatment. For example, the bright override threshold 412, the dark override threshold 414, and/or other motorized window control parameters may be adjusted in the user interface 400. The user may perform the adjustments by dragging and dropping the thresholds and/or other motorized window control parameters or by making the adjustments in another user interface.

The adjustments to the motorized window treatment control parameters and/or predicted changes to the control of the motorized window treatments based on the adjustments may be reflected in the user interface 400. As shown in FIG. 4B, the bright override threshold may be adjusted from 5000 foot candles to 4000 foot candles, which may be reflected at the adjusted bright override threshold 468. The changes in the graph 402 that may result from the adjusted bright override threshold 468 may be reflected in the graph 402. For example, an adjusted shade position 470 and/or an adjusted state indicator 472 in the system state indicator pane 420 that may predict a change that may result from the adjusted bright override threshold 468 in the graph 402. The legend 452 may define the representations in the graph 402 that indicate the adjusted information in the graph. For example, the legend 452 may define the representations in the graph 402 that indicate the adjusted bright override threshold 468, the adjusted shade position 470, and/or the adjusted state information 472.

The adjustments to the motorized window treatment control parameters may be stored, e.g., by the system controller 110, the network device 166, and/or the remote computing device 168, and may be implemented for controlling the motorized window treatment. The changes to the motorized window treatment control parameters may be stored upon selection of a save button (not shown) or other indication for storing the motorized window treatment control parameters. Prior implementations of or adjustments to the motorized window treatment control parameters may be viewed in the user interface 400. Before implementing recommended or user-defined changes, the interface 400 may show how the changes may affect the system operation by displaying the system operation with the changes being implemented on the graph 402 over the selected time period. The current implementations or adjustments may be undone and/or deleted from storage and the motorized window treatment control may revert to prior motorized window treatment control parameters for implementing the system.

Though the user interface 400 illustrates various control parameters, control states, and information, other control parameters and information may be displayed in the user interface 400. For example, the user interface 400 may indicate when there is a transition in a space from receiving daylight directly to receiving daylight indirectly or not receiving daylight directly. When there is a transition between direct daylight on a façade, the bright override threshold line may automatically adjust to, or appear at, the appropriate value. When there is direct daylight received at the space, the hold visor threshold may appear. If the daylight is being received indirectly or is not being received directly, the hold visor threshold may disappear.

The user interface 400 may be displayed on the network device 166 for displaying information to and/or obtaining input information from a user. The user interface 400 may be displayed via a local application or a remote application, such as a web interface provided by the system controller 110 or the remote computing device 168 for example.

Recommendations may be provided to the user for changing the motorized window treatment control parameters based on user input. FIG. 5 depicts an example user interface 500 that may be used for receiving user input regarding the operation of motorized window treatments. The user interface 500 may obtain information that may be used to recommend adjustments to and/or adjust the motorized window treatment control information. For example, the inputs from the user interface 500 may be used to correct a user-determined problem with the operation of the motorized window treatments 140.

As shown in FIG. 5, the user interface 500 may request a time period 502 and/or location information 504 from the user. The time period 502 may include a date and/or time at which the problem occurred. The time period 502 may include multiple dates or a timeframe within which the problem occurred. Upon selection of a date and/or time, the user interface 500 may determine one or more manual overrides 508 within the indicated date or within a pre-defined time period of the indicated time (e.g., 20 minutes). The time of the manual overrides 508 may be provided to the user to select the time that the indicated problem occurred, as this was a time in which the user may have adjusted the shade position. The location information 504 may include a group of motorized window treatments and/or a space in which the motorized window treatments may be located, such as a building, a floor or floors in a building, a room or rooms in a building, a portion of a room in a building, or a façade of a building for example.

The user interface 500 may request information 506 that may indicate a problem with the operation of the motorized window treatment and/or a type of adjustment to be made. For example, the user may indicate that the control of the motorized window treatments is allowing too much daylight in a space, too little daylight in a space, or if the frequency of the shade movements by the motorized window treatments is distracting. The types of problems or adjustments may be recommended, as indicated in the user interface 500, or may otherwise be provided by the user, such as through a text box or a voice command for example. The user interface 506 may allow the user to indicate a level of severity associated with the problem. For example, the user interface 506 may allow a user to indicate a level of brightness or darkness (e.g., between 1 and 5). The information 506 that may indicate the problem may be indicated in gradations, to request the user to indicate whether the daylight is bothering the user a little or a lot, for example. This information may be used to adjust the motorized window treatments more or less.

The user interface 500 may request a user to indicate whether the user has attempted to make a similar adjustment to the motorized window treatments before. This information may be used to determine whether an appropriate adjustment was previously made to the motorized window treatments. This information may also be combined with the gradation of the problem indicated by the user each time they report the problem to determine whether the problem is getting better and/or how much to adjust the problem.

The time period 502 and/or the location information 504 may be provided from other user interfaces, such as the user interface 400 illustrated in FIGS. 4A and 4B for example. The time period 502 and/or the location information 504 may be obtained from the user interface 500 when a user is already viewing the control of identified motorized window treatments for a time or timeframe. If the time information and the location information are determined from another source, such as the user interface 400 for example, the user interface 400 may prompt the user for the information 506. The user interface 500 may be generated upon a user selection of a button on the user interface 400 (e.g., button 466), a selection or an adjustment on the graph 402, or other user indication.

The user interface 500 may request additional information. For example, the user interface 500 may request the control state that the system was in at the indicated time. The control state may be determined independently from the date and/or time information. The user interface 500 may request the type of day (e.g., cloudy, hazy, clear, stormy, etc.). The type of day information may be considered to determine a proper recommended adjustment to the motorized window treatment control parameters. The type of day information may indicate that the problem was due to an irregular or temporary condition that may not be cause for changes to the motorized window treatment control parameters. The recommendation may indicate the type of adjustment that would be recommended to the user without the type of day information and/or the recommendation based on the type of day information. For example, the user interface 500 may indicate that based on the indicated problem it would recommend increasing one or more thresholds, but due to the type of day information indicating that it was cloudy at the time of the problem there are no recommended adjustments to the parameters.

The user interface 500 may be displayed on the network device 166 for obtaining input information from a user. The user interface 500 may be displayed via a local application or a remote application, such as a web interface provided by the system controller 110 or another remote computing device for example. The input information received from the user may be used to determine a recommendation for adjusting the control of the motorized window treatments, e.g., the system controller 110, the network device 166, and/or the remote computing device 168 for example. The input information may be received (e.g., via email, text, or other format) by an operator of the motorized window treatments (e.g., a building manager, etc.) that may decide whether to make the adjustment. In another example, the decision to make the adjustments may be automatically determined.

Figure 6:
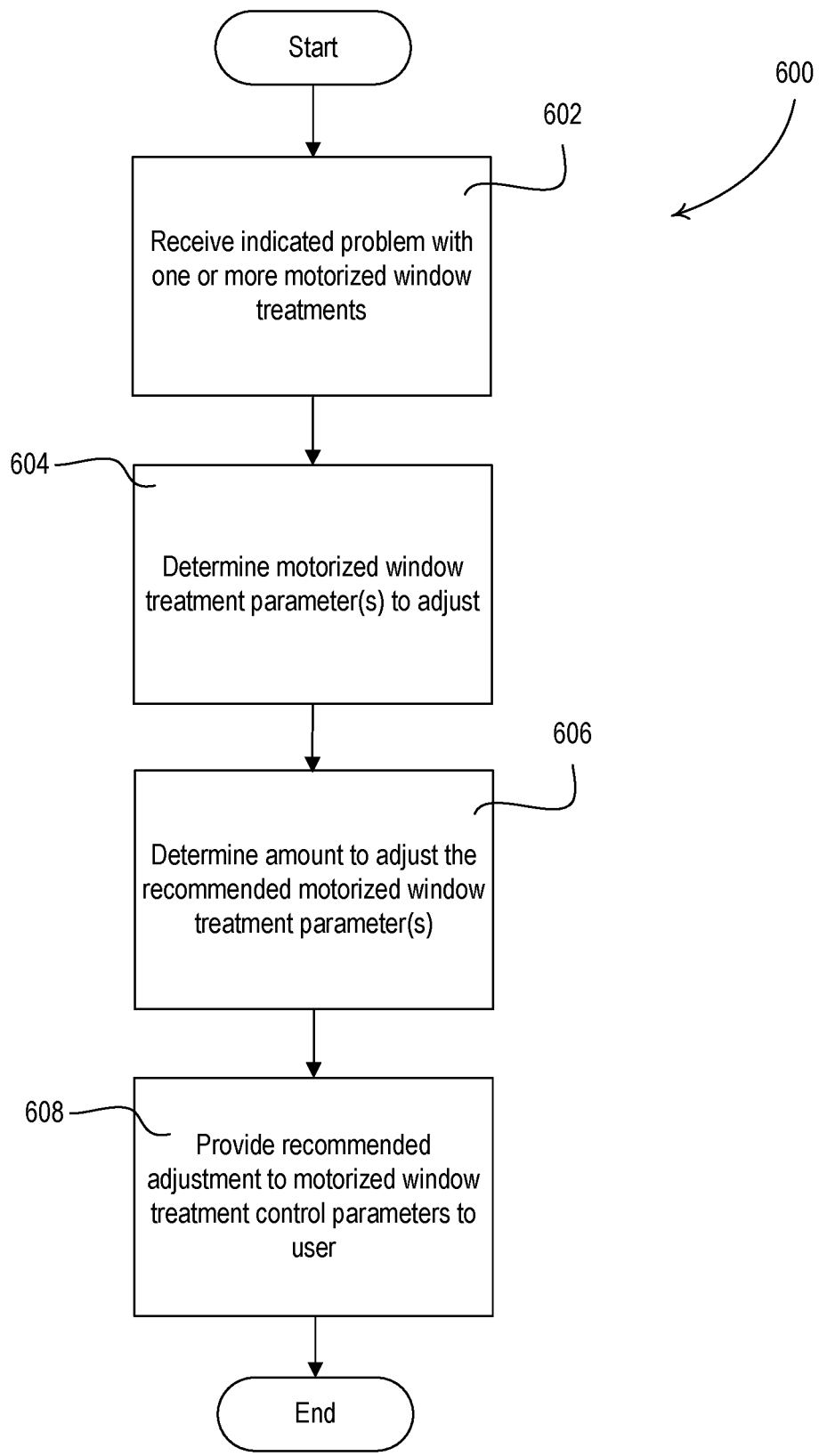
FIG. 6 is a simplified flow diagram illustrating an example method for recommending adjustments to motorized window treatment control parameters.

FIG. 6 is a simplified flow diagram illustrating an example method 600 for recommending adjustments to motorized window treatment control parameters. The method 600, or portions thereof, may be performed by the system controller 110, the network device 166, and/or the remote computing device 168 for recommending adjustments to the motorized window treatment control parameters. As shown in FIG. 6, an indication of a problem with the operation of one or more motorized window treatments may be received. For example, the user may indicate the type of problem in a user interface, such as the user interface 500 depicted in FIG. 5. The indication of one or more motorized window treatments controlled during the time period may be indicated by an identified group of motorized window treatments or a location of the motorized window treatments. A time period in which the problem occurred may also be indicated by the user.

Based on the indicated problem with one or more motorized window treatments at the indicated time period, one or more recommended motorized window treatment control parameters may be determined for adjustment at 604. For example, a user may indicate that too little or too much light is received at a time period. The user may also indicate the control state that the system was in at the indicated time period or the control state may be determined independently from the date and/or time information. To determine the recommended motorized window treatment control parameters to adjust at 604 to solve the problem indicated at 602, the settings of various motorized window treatment control parameters may be compared. The daylight intensity level and/or a number of transitions into an override state may also be considered when determining the recommended motorized window treatment control parameters to adjust at 604.

At 606, the amount to adjust the one or more recommended motorized window treatment control parameters may be determined. The amount to adjust the one or more recommended parameters may be based on a predetermined value or may be determined dynamically. For example, each parameter may be assigned a predetermined amount to adjust the parameter based on the problem indicated by the user at 602, the time of day, and/or the location of the problem. The amount to increase a parameter value may be different from the amount to decrease the parameter. For example, the recommended adjustment for increasing the bright override threshold may be to increase the threshold 1000 foot candles, while the recommended adjustment for lowering the dark override threshold may be to decrease the threshold 100 foot candles.

For motorized window treatment control parameters that are based on a daylight intensity value (e.g., thresholds), the value for the recommended adjustments may be determined dynamically at 606 based on the daylight intensity determined for an indicated time period and/or location of the indicated problem. The value of the recommended adjustment may be increased or decreased to the daylight intensity or further to prevent the problem from occurring again under similar conditions. For example, where the daylight intensity for a given time period reaches 6000 foot candles, a bright override threshold of 5000 foot candles may be increased to 6500 foot candles. The amount that the recommended value is adjusted to exceed the daylight level may be a predefined amount that may correspond to each motorized window treatment control parameter.

The one or more recommended motorized window treatment control parameters and/or the amount to adjust each parameter may be provided at 608. For example, the one or more recommended motorized window treatment control parameters and/or the amount to adjust each parameter may be provided (e.g., from the system controller 110, the remote computing device 168, or internal storage) for display to a user.

To compare the motorized window treatment control parameters, each motorized window treatment control parameter may be assigned a value or weight (e.g., for determining the control parameters that have the greatest impact in the problem). The value or weight may be assigned based on a rule that may correspond to the motorized window treatment control parameter and/or the problem indicated by the user. The motorized window treatment control parameters may be weighted differently based on the user's selection of the indicated problem with the motorized window treatments.

A recommended change to the motorized window treatment control parameters may also be determined in an attempt to fix the identified problem. For example, the recommended change may be provided in an attempt to prevent the user from reporting the same problem under the same conditions. Based on the rules for each motorized window treatment control parameter, possible recommendations may be determined as well as a value (e.g., weight values 1 through 5) for each recommendation. A lower value (e.g., a weight value of 1) may indicate that a motorized window treatment control parameter may be less likely to improve system performance and may be less likely to be recommended. The lowest value may be a recommendation to make no adjustments. A higher value (e.g., a weight value of 5) may indicate that a motorized window treatment control parameter may be more likely to improve system performance and may be more likely to be recommended.

TABLE 1 illustrates example weights and recommendations that may be given to various visor positions when a user indicates that too much light or not enough light is entering a space.

TABLE 1

Visor Position Weighting and Recommendations

| Weight | Raise Visor Position (Not enough light) | Lower Visor Position (Too much light) |
| --- | --- | --- |
| 1 | Visor position is between 40-100% of window Recommend: No change | Visor position is between 0-30% of window Recommend: No change |
| 2 | Visor position is between 30-40% of window Recommend: Set visor position to 50% of window | Visor position is between 30-60% of window Recommend: Lower visor position by 10% of window |
| 3 | Visor position is between 20-30% of window Recommend: Set visor position to 40% of window | Visor position is between 60-75% of window Recommend: Set visor position to 50% of window |

TABLE 1-continued

Visor Position Weighting and Recommendations

| Weight | Raise Visor Position (Not enough light) | Lower Visor Position (Too much light) |
|---|---|---|
| 4 | Visor position is between 10-20% of window Recommend: Set visor position to 40% of window | Visor position is between 75-90% of window Recommend: Set visor position to 50% of window |
| 5 | Visor position is between 0-10% of window Recommend: Set visor position to 30% of window | Visor position is between 90-100% of window Recommend: Set visor position to 60% of window |

As shown in TABLE 1, visor positions within various ranges may be given different weights based on the visor position setting on a window at an identified time. The weights for the visor positions may be based on the current visor position setting or a visor position setting at an otherwise identified time (e.g., time identified in graph 402 or otherwise selected by a user). Examples of recommended changes to the visor position are also included in TABLE 1 in an attempt to fix the identified problems (e.g., to prevent the user from reporting the same problems under the same conditions).

TABLE 2 illustrates example weights and recommendations that may be given to various dark override threshold values when a user indicates that too much light or not enough light is entering a space.

TABLE 2

Dark Override Threshold Weighting and Recommendations

| Weight | Raise Dark Override Threshold (Not enough light in automated control state) | Lower Dark Override Threshold (Too much light in dark override state) |
|---|---|---|
| 1 | Daylight intensity level is below dark override threshold Recommend: No change | Daylight intensity level is above dark override threshold and hysteresis Recommend: No change |
| 2 | Daylight intensity level is 70-100% above dark override threshold Recommend: Increase dark override threshold to daylight intensity level plus 20% | Daylight intensity level is 70-100% below dark override threshold and hysteresis Recommend: Decrease dark override threshold by the greater of 100 fc or ((dark override threshold + hysteresis) − daylight intensity level)*120% |
| 3 | Daylight intensity level is 40-70% above dark override threshold Recommend: Increase dark override threshold to daylight intensity level plus 20% | Daylight intensity level is 40-70% below dark override threshold and hysteresis Recommend: Decrease dark override threshold by the greater of 100 fc or ((dark override threshold + hysteresis) − daylight intensity level)*120% |
| 4 | Daylight intensity level is 20-40% above dark override threshold Recommend: Increase dark override threshold to daylight intensity level plus 20% | Daylight intensity level is 20-40% below dark override threshold and hysteresis Recommend: Decrease dark override threshold by the greater of 100 fc or ((dark override threshold + hysteresis) − daylight intensity level)*120% |
| 5 | Daylight intensity level is 0-20% above dark override threshold | Daylight intensity level is 0-20% below dark override threshold and hysteresis |

TABLE 2-continued

Dark Override Threshold Weighting and Recommendations

| Weight | Raise Dark Override Threshold (Not enough light in automated control state) | Lower Dark Override Threshold (Too much light in dark override state) |
|---|---|---|
|  | Recommend: Increase dark override threshold to daylight intensity level plus 20% | Recommend: Decrease dark override threshold by the greater of 100 fc or ((dark override threshold + hysteresis) − daylight intensity level)*120% |

As shown in TABLE 2, the dark override threshold may be given different weights based on the daylight intensity level rising above or falling below the dark override threshold by a predetermined amount. The daylight intensity level may be the current daylight intensity level, the daylight intensity level over a period of time (e.g., a day, a month, a year, a time displayed in graph 402, or a time otherwise selected by a user), the daylight intensity level over a predefined period of time from the current time, or another intensity level that may be indicated by a user. Examples of recommended changes to the dark override threshold are also included in TABLE 2 in an attempt to fix the identified problems (e.g., to prevent the user from reporting the same problems under the same conditions).

TABLE 3 illustrates example weights and recommendations that may be given to various dark override positions when a user indicates that too much light or not enough light is entering a space.

TABLE 3

Dark Override Position Weighting and Recommendations

| Weight | Raise Dark Override Position (Not enough light in dark override state) | Lower Dark Override Position (Too much light in dark override state) |
|---|---|---|
| 1 | Dark override position is between 90-100% of window Recommend: No change | Dark override position is between 0-90% of window Recommend: No Change |
| 2 | Dark override position is between 80-90% of window Recommend: Set dark override position to 100% | Dark override position is between 90-100% of window Recommend: Decrease dark override position by 10% |
| 3 | Dark override position is between 70-80% of window Recommend: Set dark override position to 100% | N/A |
| 4 | Dark override position is between 50-70% of window Recommend: Set dark override position to 100% | N/A |
| 5 | Dark override position is between 0-50% of window Recommend: Set dark override position to 75% | N/A |

As shown in TABLE 3, dark override positions within various ranges may be given different weights based on the dark override position setting on a window at an identified time (e.g., current time, a time identified in graph 402, or a time otherwise selected by a user). Where the weighted values are unavailable for a given motorized window treatment control parameter, the weighting may be limited to the available values. For example, the dark override position may be assigned a weight of one or two when a user indicates that too much light is entering the space. These lower values may give the dark override position a lower priority than other motorized window treatment control parameters that may have larger values available. Examples of recommended changes to the dark override position are also included in TABLE 3 in an attempt to fix the identified problems (e.g., to prevent the user from reporting the same problems under the same conditions).

TABLE 4 illustrates example weights and recommendations that may be given to various dark override delay values when a user indicates that too much light or not enough light is entering a space.

TABLE 4

Dark Override Delay Weighting and Recommendations

| Weight | Increase Dark Override Delay (Too much light in dark override state) | Decrease Dark Override Delay (Not enough light in automated control state) |
|---|---|---|
| 1 | Dark override delay >30 min or 0 transitions into dark override state over period of time (e.g., since the beginning of a day) Recommend: No change | Daylight intensity level above dark override threshold Recommend: No change |
| 2 | Dark override delay <30 min and 1+ transitions into dark override state over period of time (e.g., since the beginning of a day) Recommend: Increase dark override delay by 20 minutes | Dark override delay >15 min and daylight intensity level below dark override threshold for >5 min Recommend: Decrease dark override delay by 50% |
| 3 | Dark override delay <30 min and 2+ transitions into dark override state over period of time (e.g., since the beginning of a day) Recommend: Increase dark override delay by 20 minutes | Dark override delay >30 min and daylight intensity level below dark override threshold for >5 min Recommend: Decrease dark override delay by 50% |
| 4 | Dark override delay <15 min and 2+ transitions into dark override state over period of time (e.g., since the beginning of a day) Recommend: Increase dark override delay by 15 minutes | Dark override delay >60 min and daylight intensity level below dark override threshold for >15 min Recommend: Decrease dark override delay by 50% |
| 5 | Dark override delay <15 min and 3+ transitions into dark override state over period of time (e.g., since the beginning of a day) Recommend: Increase dark override delay by 15 minutes | Dark override delay >60 min and daylight intensity level below dark override threshold for >30 min Recommend: Decrease dark override delay by 50% |

As shown in TABLE 4, the dark override delay may be given different weights based on the dark override delay value at an identified time (e.g., current time, a time displayed in graph 402, or a time otherwise selected by a user), the number of transitions into dark override state over a period of time (e.g., since the beginning of a day), the daylight intensity level over a period of time, and/or the dark override threshold. The dark override delay value and/or the number of transitions into dark override state over a period of time may be used to determine the weight when the user indicates that too much light is being received in a space. The period of time over which the number of transitions is accumulated to determine the weight may be a predefined period of time (e.g., an hour, a day, a month, a year, etc.), a predefined amount of time prior to the current time, or an amount of time otherwise selected by the user (e.g., a time displayed in graph 402). The daylight intensity level and/or the dark override threshold may be used to determine the weight when the user indicates that not enough light is being received at a space. The amount of time over which the daylight intensity level is measured may be a predefined period of time (e.g., an hour, a day, a month, a year, etc.), a predefined amount of time prior to the current time, or an amount of time otherwise selected by the user (e.g., a time displayed in graph 402). Examples of recommended changes to the dark override delay are also included in TABLE 4 in an attempt to fix the identified problems (e.g., to prevent the user from reporting the same problems under the same conditions).

TABLE 5 illustrates example weights and recommendations that may be given to various dark override hysteresis values when a user indicates that too much light or not enough light is entering a space.

TABLE 5

Dark Override Hysteresis Weighting and Recommendations

| Weight | Raise Dark Override Hysteresis (Not enough light in automated control state) | Lower Dark Override Hysteresis (Too much light in dark override state) |
|---|---|---|
| 1 | Dark override hysteresis >100 fc or 0 transitions into dark override state over period of time (e.g., since the beginning of a day) Recommend: No change | Dark override hysteresis is <100 fc Recommend: No change |
| 2 | Dark override hysteresis <100 fc and 1+ transitions into dark override state over period of time (e.g., since the beginning of a day) Recommend: Increase dark override hysteresis by 50 fc | Dark override hysteresis is >100 fc Recommend: Decrease dark override hysteresis by 50 fc |
| 3 | Dark override hysteresis <50 fc and 2+ transitions into dark override state over period of time (e.g., since the beginning of a day) Recommend: Set dark override hysteresis to 100 fc | Dark override hysteresis is >200 fc Recommend: Decrease dark override hysteresis by 150 fc |
| 4 | Dark override hysteresis <50 fc and 3+ transitions into dark override state over period of time (e.g., since the beginning of a day) Recommend: Set dark override hysteresis to 100 fc | Dark override hysteresis is >300 fc Recommend: Decrease dark override hysteresis by 200 fc |
| 5 | Dark override hysteresis <50 fc and 4+ transitions into dark override state over period of time (e.g., since the beginning of a day) Recommend: Set dark override hysteresis to 100 fc | N/A |

As shown in TABLE 5, the dark override hysteresis may be given different weights based on the dark override hysteresis value at an identified time (e.g., current time, a time displayed in graph 402, or a time otherwise selected by a user) and/or the number of transitions into dark override state over a period of time (e.g., since the beginning of a day). The period of time over which the number of transitions is accumulated may be a predefined period of time (e.g., an hour, a day, a month, a year, etc.), a predefined amount of time prior to the current time, or an amount of time otherwise selected by the user (e.g., a time displayed in graph 402). Examples of recommended changes to the dark override hysteresis are also included in TABLE 5 in an attempt to fix the identified problems (e.g., to prevent the user from reporting the same problems under the same conditions).

TABLE 6 illustrates example weights and recommendations that may be given to various direct bright override threshold values when a user indicates that too much light or not enough light is entering a space.

TABLE 6

Direct Bright Override Threshold
Weighting and Recommendations

| Weight | Raise Direct Bright Override Threshold (Not enough light in bright override state) | Lower Direct Bright Override Threshold (Too much light in automated control state) |
|---|---|---|
| 1 | Daylight intensity level is below direct bright override threshold minus hysteresis Recommend: No change | Daylight intensity level is above direct bright override threshold Recommend: No change |
| 2 | Daylight intensity level is 70-100% above direct bright override threshold minus hysteresis Recommend: Increase direct bright override threshold by the greater of 500 fc or (daylight intensity level − (direct bright override threshold − hysteresis))*120% | Daylight intensity level is 70-100% below direct bright override threshold Recommend: Decrease direct bright override threshold to daylight intensity level plus 20% |
| 3 | Daylight intensity level is 40-70% above direct bright override threshold minus hysteresis Recommend: Increase direct bright override threshold by the greater of 500 fc or (daylight intensity level − (direct bright override threshold − hysteresis))*120% | Daylight intensity level is 40-70% below direct bright override threshold Recommend: Decrease direct bright override threshold to daylight intensity level plus 20% |
| 4 | Daylight intensity level is 20-40% above direct bright override threshold minus hysteresis Recommend: Increase direct bright override threshold by the greater of 500 fc or (daylight intensity level − (direct bright override threshold − hysteresis))*120% | Daylight intensity level is 20-40% below direct bright override threshold Recommend: Decrease direct bright override threshold to daylight intensity level plus 20% |
| 5 | Daylight intensity level is 0-20% above direct bright override threshold minus hysteresis Recommend: Increase direct bright override threshold by the greater of 500 fc or (daylight intensity level − (direct bright override threshold − hysteresis))*120% | Daylight intensity level is 0-20% below direct bright override threshold Recommend: Decrease direct bright override threshold to daylight intensity level plus 20% |

As shown in TABLE 6, the direct bright override threshold may be given different weights based on the daylight intensity level rising above or falling below the direct bright override threshold by a predetermined amount. The daylight intensity level may be the current daylight intensity level, the daylight intensity level over a period of time (e.g., a day, a month, a year, a time displayed in graph 402, or a time otherwise selected by a user), the daylight intensity level over a predefined period of time from the current time, or another intensity level that may be indicated by a user. Examples of recommended changes to the direct bright override threshold are also included in TABLE 6 in an attempt to fix the identified problems (e.g., to prevent the user from reporting the same problems under the same conditions).

TABLE 7 illustrates example weights and recommendations that may be given to indirect bright override thresholds when a user indicates that too much light or not enough light is entering a space.

TABLE 7

Indirect Bright Override Threshold
Weighting and Recommendations

| Weight | Raise Indirect Bright Override Threshold (Not enough light in bright override state) | Lower Indirect Bright Override Threshold (Too much light in automated control state) |
|---|---|---|
| 1 | Daylight intensity level is below indirect bright override threshold minus hysteresis Recommend: No change | Daylight intensity level is above indirect bright override threshold Recommend: No change |
| 2 | Daylight intensity level is 70-100% above indirect bright override threshold minus hysteresis Recommend: Increase indirect bright override threshold by the greater of 500 fc or (daylight intensity level − (direct bright override threshold − hysteresis))*120% | Daylight intensity level is 70-100% below indirect bright override threshold Recommend: Decrease indirect bright override threshold to daylight intensity level plus 20% |
| 3 | Daylight intensity level is 40-70% above indirect bright override threshold minus hysteresis Recommend: Increase indirect bright override threshold by the greater of 500 fc or (daylight intensity level − (direct bright override threshold − hysteresis))*120% | Daylight intensity level is 40-70% below indirect bright override threshold Recommend: Decrease indirect bright override threshold to daylight intensity level plus 20% |
| 4 | Daylight intensity level is 20-40% above indirect bright override threshold minus hysteresis Recommend: Increase indirect bright override threshold by the greater of 500 fc or (daylight intensity level − (direct bright override threshold − hysteresis))*120% | Daylight intensity level is 20-40% below indirect bright override threshold Recommend: Decrease indirect bright override threshold to daylight intensity level plus 20% |
| 5 | Daylight intensity level is 0-20% above indirect bright override threshold minus hysteresis Recommend: Increase indirect bright override threshold by the greater of 500 fc or (daylight intensity level − (direct bright override threshold − hysteresis))*120% | Daylight intensity level is 0-20% below indirect bright override threshold Recommend: Decrease indirect bright override threshold to daylight intensity level plus 20% |

As shown in TABLE 7, the indirect bright override threshold may be given different weights based on the daylight intensity level rising above or falling below the indirect bright override threshold by a predetermined amount. The daylight intensity level may be the current daylight intensity level, the daylight intensity level over a period of time (e.g., a day, a month, a year, a time displayed in graph 402, or a time otherwise selected by a user), the daylight intensity level over a predefined period of time from the current time, or another intensity level that may be indicated by a user. Examples of recommended changes to the indirect bright override threshold are also included in TABLE 7 in an attempt to fix the identified problems (e.g., to prevent the user from reporting the same problems under the same conditions). Where the bright override threshold is a single threshold, rather than the direct bright override threshold and the indirect bright override threshold, a similar weighting may be given to the bright override threshold as is indicated in TABLE 6 or TABLE 7.

TABLE 8 illustrates example weights and recommendations that may be given to various bright override positions when a user indicates that too much light or not enough light is entering a space.

TABLE 8

Bright Override Position Weighting and Recommendations

| Weight | Raise Bright Override Position (Not enough light in bright override state) | Lower Bright Override Position (Too much light in bright override state) |
|---|---|---|
| 1 | Bright override position is between 20-100% of window<br>Recommend: No change | Bright override position is between 0-20% of window<br>Recommend: No change |
| 2 | Bright override position is between 10-20% of window<br>Recommend: Increase bright override position by 10% | Bright override position is between 20-30% of window<br>Recommend: Set bright override position to 0% |
| 3 | Bright override position is between 0-10% of window<br>Recommend: Increase bright override position by 10% | Bright override position is between 30-40% of window<br>Recommend: Set bright override position to 0% |
| 4 | N/A | Bright override position is between 40-50% of window<br>Recommend: Set bright override position to 0% |
| 5 | N/A | Bright override position is between 50-100% of window<br>Recommend: Set bright override position to 25% |

As shown in TABLE 8, bright override positions within various ranges may be given different weights based on the bright override position setting on a window at an identified time (e.g., current time, a time identified in graph 402, or a time otherwise selected by a user). Examples of recommended changes to the bright override position are also included in TABLE 8 in an attempt to fix the identified problems (e.g., to prevent the user from reporting the same problems under the same conditions).

TABLE 9 illustrates example weights and recommendations that may be given to various hold visor override threshold values when a user indicates that too much light or not enough light is entering a space that receives direct sunlight.

TABLE 9

Hold Visor Override Threshold Weighting and Recommendations for Space in Direct Sun

| Weight | Raise Hold Visor Override Threshold (Not enough light in automated control state) | Lower Hold Visor Override Threshold (Too much light in hold visor override state) |
|---|---|---|
| 1 | Daylight intensity level is below hold visor override threshold<br><br>Recommend: No change | Daylight intensity level above hold visor override threshold and hold visor override hysteresis<br>Recommend: No change |
| 2 | Daylight intensity level is 70-100% above hold visor override threshold<br><br>Recommend: Increase hold visor override threshold to daylight intensity level plus 20% | Daylight intensity level is 70-100% below hold visor override threshold and hold visor override hysteresis<br>Recommend: Decrease hold visor override threshold by the greater of 300 fc or ((hold visor override threshold + hysteresis) – daylight intensity level)*120% |
| 3 | Daylight intensity level is 40-70% above hold visor override threshold<br><br>Recommend: Increase hold visor override threshold to daylight intensity level plus 20% | Daylight intensity level is 40-70% below hold visor override threshold and hold visor override hysteresis<br>Recommend: Decrease hold visor override threshold by the greater of 300 fc or ((hold visor override threshold + hysteresis) – daylight intensity level)*120% |
| 4 | Daylight intensity level is 20-40% above hold visor override threshold<br><br>Recommend: Increase hold visor override threshold to daylight intensity level plus 20% | Daylight intensity level is 20-40% below hold visor override threshold and hold visor override hysteresis<br>Recommend: Decrease hold visor override threshold by the greater of 300 fc or ((hold visor override threshold + hysteresis) – daylight intensity level)*120% |
| 5 | Daylight intensity level is 0-20% above hold visor override threshold<br><br>Recommend: Increase hold visor override threshold to daylight intensity level plus 20% | Daylight intensity level is 0-20% below hold visor override threshold and hold visor override hysteresis<br>Recommend: Decrease hold visor override threshold by the greater of 300 fc or ((hold visor override threshold + hysteresis) – daylight intensity level)*120% |

As shown in TABLE 9, the value of the hold visor override threshold may be given different weights based on the daylight intensity level rising above or falling below the hold visor override threshold by a predetermined amount. The daylight intensity level may be the current daylight intensity level, the daylight intensity level over a period of time (e.g., a day, a month, a year, a time displayed in graph 402, or a time otherwise selected by a user), the daylight intensity level over a predefined period of time from the current time, or another intensity level that may be indicated by a user. Examples of recommended changes to the hold visor override threshold are also included in TABLE 9 in an attempt to fix the identified problems (e.g., to prevent the user from reporting the same problems under the same conditions).

TABLE 10 illustrates example weights and recommendations that may be given to various bright override delay values when a user indicates that too much light or not enough light is entering a space.

TABLE 10

Bright Override Delay Weighting and Recommendations

| Weight | Increase Bright Override Delay (Too much light in automated control state) | Decrease Bright Override Delay (Not enough light in bright override state) |
|---|---|---|
| 1 | Bright override delay >30 min or 0 transitions into bright override state over period of time (e.g., since the beginning of a day) Recommend: No change | Daylight intensity level is above bright override threshold minus hysteresis Recommend: No change |
| 2 | Bright override delay <30 min and 1+ transitions into bright override state over period of time (e.g., since the beginning of a day) Recommend: Increase bright override delay by 20 minutes | Bright override delay >15 min and daylight intensity level is below bright override threshold minus hysteresis for >5 min Recommend: Decrease bright override delay by 50% |
| 3 | Bright override delay <30 min, 2+ transitions into bright override state over period of time (e.g., since the beginning of a day) Recommend: Increase bright override delay by 20 minutes | Bright override delay >30 min and daylight intensity level is below bright override threshold minus hysteresis for >5 min Recommend: Decrease bright override delay by 50% |
| 4 | Bright override delay <15 min, 2+ transitions into bright override state over period of time (e.g., since the beginning of a day) Recommend: Increase bright override delay by 15 minutes | Bright override delay >60 min and daylight intensity level is below bright override threshold minus hysteresis for >15 min Recommend: Decrease bright override delay by 50% |
| 5 | Bright override delay <15 min and 3+ transitions into bright override state over period of time (e.g., since the beginning of a day) Recommend: Increase bright override delay by 15 minutes | Bright override delay >60 min and daylight intensity level is below bright override threshold minus hysteresis for >30 min Recommend: Decrease bright override delay by 50% |

As shown in TABLE 10, the bright override delay may be given different weights based on the bright override delay value at an identified time (e.g., current time, a time displayed in graph 402, or a time otherwise selected by a user), the number of transitions into bright override state over a period of time (e.g., since the beginning of a day), the daylight intensity level over a period of time, and/or the bright override threshold. The bright override delay value and/or the number of transitions into bright override state over a period of time may be used to determine the weight when the user indicates that too much light is being received in a space. The period of time over which the number of transitions is accumulated to determine the weight may be a predefined period of time (e.g., an hour, a day, a month, a year, etc.), a predefined amount of time prior to the current time, or an amount of time otherwise selected by the user (e.g., a time displayed in graph 402). The daylight intensity level and/or the bright override threshold may be used to determine the weight when the user indicates that not enough light is being received at a space. The amount of time over which the daylight intensity level is measured may be a predefined period of time (e.g., an hour, a day, a month, a year, etc.), a predefined amount of time prior to the current time, or an amount of time otherwise selected by the user (e.g., a time displayed in graph 402). Examples of recommended changes to the bright override delay are also included in TABLE 10 in an attempt to fix the identified problems (e.g., to prevent the user from reporting the same problems under the same conditions).

TABLE 11 illustrates example weights and recommendations that may be given to various direct bright override hysteresis values when a user indicates that too much light or not enough light is entering a space.

TABLE 11

Direct Bright Override Hysteresis Weighting and Recommendations

| Weight | Raise Direct Bright Override Hysteresis (Too much light in automated control state) | Lower Direct Bright Override Hysteresis (Not enough light in direct bright override state) |
|---|---|---|
| 1 | Direct bright override hysteresis >500 fc or 0 transitions into bright override state over period of time (e.g., since the beginning of a day) Recommend: No change | Direct bright override hysteresis is <500 fc Recommend: No change |
| 2 | Direct bright override hysteresis <500 fc and 1+ transitions into bright override state over period of time (e.g., since the beginning of a day) Recommend: Increase direct bright override hysteresis by 500 fc | Direct bright override hysteresis is >500 fc Recommend: Set direct bright override hysteresis to 500 fc |
| 3 | Direct bright override hysteresis <300 fc and 1+ transitions into bright override state over period of time (e.g., since the beginning of a day) Recommend: Set direct bright override hysteresis to 1000 fc | Direct bright override hysteresis is >1500 fc Recommend: Set direct bright override hysteresis to 1000 fc |
| 4 | Direct bright override hysteresis <300 fc and 2+ transitions into bright override state over period of time (e.g., since the beginning of a day) Recommend: Set direct bright override hysteresis to 1000 fc | Direct bright override hysteresis is >3000 fc Recommend: Set direct bright override hysteresis to 1000 fc |
| 5 | Direct bright override hysteresis <300 fc and 3+ transitions into bright override state over period of time (e.g., since the beginning of a day) Recommend: Set direct bright override hysteresis to 1000 fc | N/A |

As shown in TABLE 11, the direct bright override hysteresis may be given different weights based on the direct bright override hysteresis value at an identified time (e.g., current time, a time displayed in graph 402, or a time otherwise selected by a user) and/or the number of transitions into the bright override state over a period of time (e.g., since the beginning of a day). The period of time over which the number of transitions is accumulated may be a predefined period of time (e.g., an hour, a day, a month, a year, etc.), a predefined amount of time prior to the current time, or an amount of time otherwise selected by the user (e.g., a time displayed in graph 402). Examples of recommended changes to the direct bright override hysteresis are also included in TABLE 11 in an attempt to fix the identified problems (e.g., to prevent the user from reporting the same problems under the same conditions).

TABLE 12 illustrates example weights and recommendations that may be given to various indirect bright override hysteresis values when a user indicates that too much light or not enough light is entering a space.

TABLE 12

Indirect Bright Override Hysteresis Weighting and Recommendations

| Weight | Raise Indirect Bright Override Hysteresis (Too much light in automated control state) | Lower Indirect Bright Override Hysteresis (Not enough light in indirect bright override state) |
|---|---|---|
| 1 | Indirect bright override hysteresis >250 fc or 0 transitions into direct bright override state over period of time (e.g., since the beginning of a day) Recommend: No change | Direct bright override hysteresis is <250 fc Recommend: No change |
| 2 | Indirect bright override hysteresis <250 fc and 1+ transitions into direct bright override state over period of time (e.g., since the beginning of a day) Recommend: Increase indirect bright override hysteresis by 250 fc | Direct bright override hysteresis is >250 fc Recommend: Set indirect bright override hysteresis to 250 fc |
| 3 | Indirect bright override hysteresis <150 fc and 1+ transitions into direct bright override state over period of time (e.g., since the beginning of a day) Recommend: Set indirect bright override hysteresis to 500 fc | Direct bright override hysteresis is >750 fc Recommend: Set indirect bright override hysteresis to 500 fc |
| 4 | Indirect bright override hysteresis <150 fc and 2+ transitions into direct bright override state over period of time (e.g., since the beginning of a day) Recommend: Set indirect bright override hysteresis to 500 fc | Direct bright override hysteresis is >1500 fc Recommend: Set indirect bright override hysteresis to 500 fc |
| 5 | Indirect bright override hysteresis <150 fc and 3+ transitions into direct bright override state over period of time (e.g., since the beginning of a day) Recommend: Set indirect bright override hysteresis to 500 fc | N/A |

As shown in TABLE 12, the indirect bright override hysteresis may be given different weights based on the indirect bright override hysteresis value at an identified time (e.g., current time, a time displayed in graph 402, or a time otherwise selected by a user) and/or the number of transitions into the bright override state over a period of time (e.g., since the beginning of a day). The period of time over which the number of transitions is accumulated may be a predefined period of time (e.g., an hour, a day, a month, a year, etc.), a predefined amount of time prior to the current time, or an amount of time otherwise selected by the user (e.g., a time displayed in graph 402). Examples of recommended changes to the indirect bright override hysteresis are also included in TABLE 12 in an attempt to fix the identified problems.

TABLE 13 illustrates example weights and recommendations that may be given to various start of day and/or end of day ramping period slopes when a user indicates that too much light or not enough light is entering a space. Examples of recommended changes to the various start of day and/or end of day ramping period slopes are included in TABLE 13 in an attempt to fix the identified problems (e.g., to prevent the user from reporting the same problems under the same conditions).

TABLE 13

Dark Override Ramp Slope Weighting and Recommendations

| Weight | Raise Dark Override Ramp Slope (Not enough light in automated control state) | Lower Dark Override Ramp Slope (Too much light in dark override state) |
|---|---|---|
| 1 | Daylight intensity level is below dark override threshold Recommend: No change | Daylight intensity level is above dark override threshold + hysteresis Recommend: No change |
| 2 | Daylight intensity level is 70-100% above dark override threshold Recommend: Increase dark override ramp slope to predetermined amount | Daylight intensity level is 70-100% below dark override threshold + hysteresis Recommend: Decrease dark override ramp slope to predetermined amount |
| 3 | Daylight intensity level is 40-70% above dark override threshold Recommend: Increase dark override ramp slope to predetermined amount | Daylight intensity level is 40-70% below dark override threshold + hysteresis Recommend: Decrease dark override ramp slope to predetermined amount |
| 4 | Daylight intensity level is 20-40% above dark override threshold Recommend: Increase dark override ramp slope to predetermined amount | Daylight intensity level is 20-40% below dark override threshold + hysteresis Recommend: Decrease dark override ramp slope to predetermined amount |
| 5 | Daylight intensity level is 0-20% above dark override threshold Recommend: Increase dark override ramp slope to predetermined amount | Daylight intensity level is 0-20% below dark override threshold + hysteresis Recommend: Decrease dark override ramp slope to predetermined amount |

TABLE 14 illustrates example weights and recommendations that may be given to various depth of maximum daylight penetration values when a user indicates that too much light or not enough light is entering a space.

TABLE 14

Depth of Maximum Daylight Penetration Weighting and Recommendations

| Weight | Raise Depth of Maximum Daylight Penetration (Not enough light) | Lower Depth of Maximum Daylight Penetration (Too much light) |
|---|---|---|
| 1 | Depth of maximum daylight penetration is >24" Recommend: No change | Depth of maximum daylight penetration is <24" Recommend: No change |
| 2 | Depth of maximum daylight penetration is <24" | Depth of maximum daylight penetration is <48" |

TABLE 14-continued

Depth of Maximum Daylight Penetration Weighting and Recommendations

| Weight | Raise Depth of Maximum Daylight Penetration (Not enough light) | Lower Depth of Maximum Daylight Penetration (Too much light) |
|---|---|---|
| 3 | Recommend: Increase depth of maximum daylight penetration by 6" Depth of maximum daylight penetration is <10" Recommend: Increase depth of maximum daylight penetration by 6" | Recommend: Decrease depth of maximum daylight penetration by 12" Depth of maximum daylight penetration is >48" Recommend: Decrease depth of maximum daylight penetration by 16" |
| 4 | Depth of maximum daylight penetration is <6" Recommend: Increase depth of maximum daylight penetration by 6" | N/A |
| 5 | Depth of maximum daylight penetration is <2" Recommend: Increase depth of maximum daylight penetration by 6" | N/A |

As shown in TABLE 14, the depth of maximum daylight penetration may be given different weights based on the depth of maximum daylight penetration values at an identified time (e.g., current time, a time displayed in graph 402, or a time otherwise selected by a user). Examples of recommended changes to the depth of the maximum daylight penetration are also included in TABLE 14 in an attempt to fix the identified problems (e.g., to prevent the user from reporting the same problems under the same conditions).

TABLE 15 illustrates example weights and recommendations that may be given to various hold visor override delay values when a user indicates that too much light or not enough light is entering a space.

TABLE 15

Hold Visor Override Delay Weighting and Recommendations

| Weight | Raise Hold Visor Override Delay (Too much light, in hold visor override state) | Lower Hold Visor Override Delay (Not enough light, in automated control state) |
|---|---|---|
| 1 | Hold visor override delay is >30 minutes or 0 transitions into hold visor override state over period of time (e.g., since the beginning of a day) Recommend: No change | Daylight intensity level is above the hold visor override threshold Recommend: No change |
| 2 | Hold visor override delay is <30 minutes and 1+ transitions into hold visor override state over period of time (e.g., since the beginning of a day) Recommend: Increase hold visor override delay by 20 minutes | Hold visor override delay is >15 minutes and daylight intensity level has been below the hold visor override threshold for >5 minutes Recommend: Decrease hold visor override delay by 50% |
| 3 | Hold visor override delay is <30 minutes and 2+ transitions into hold visor override state over period of time (e.g., since the beginning of a day) Recommend: Increase hold visor override delay by 20 minutes | Hold visor override delay is >30 minutes and daylight intensity level has been below the hold visor override threshold for >5 minutes Recommend: Decrease hold visor override delay by 50% |
| 4 | Hold visor override delay is <15 minutes and 2+ transitions into hold visor override state over period of time (e.g., since the beginning of a day) Recommend: Increase hold visor override delay by 15 minutes | Hold visor override delay is >60 minutes and daylight intensity level has been below the hold visor override threshold for >15 minutes Recommend: Decrease hold visor override delay by 50% |
| 5 | Hold visor override delay is <15 minutes and 3+ transitions into hold visor override state over period of time (e.g., since the beginning of a day) Recommend: Increase hold visor override delay by 15 minutes | Hold visor override delay is >60 minutes and daylight intensity level has been below the hold visor override threshold for >30 minutes Recommend: Decrease hold visor override delay by 50% |

As shown in TABLE 15, the hold visor override delay may be given different weights based on the hold visor override delay value, the number of hold visor override state transitions within a period of time, the daylight intensity value at a period of time (e.g., current time, a time displayed in graph 402, or a time otherwise selected by a user), and/or the hold visor override threshold. Examples of recommended changes to the hold visor override delay are also included in TABLE 15 in an attempt to fix the identified problems (e.g., to prevent the user from reporting the same problems under the same conditions).

TABLE 16 illustrates example weights and recommendations that may be given to various hold visor override hysteresis values when a user indicates that too much light or not enough light is entering a space.

TABLE 16

Hold Visor Override Hysteresis Weighting and Recommendations

| Weight | Raise Hold Visor Override Hysteresis (Not enough light in automated control state) | Lower Hold Visor Override Hysteresis (Too much light in hold visor override state) |
|---|---|---|
| 1 | Hold visor override hysteresis >300 fc or 0 transitions into hold visor override state over period of time (e.g., since the beginning of a day) Recommend: No change | Hold visor override hysteresis is <300 fc Recommend: No change |
| 2 | Hold visor override hysteresis <300 fc and 1+ transitions into hold visor override state over period of time (e.g., since the beginning of a day) Recommend: Increase hold visor override hysteresis by 100 fc | Hold visor override hysteresis is >300 fc Recommend: Decrease hold visor override hysteresis by 100 fc |
| 3 | Hold visor override hysteresis <100 fc and 2+ transitions into hold visor override state over period of time (e.g., since the beginning of a day) Recommend: Set hold visor override hysteresis to 300 fc | Hold visor override hysteresis is >600 fc Recommend: Decrease hold visor override hysteresis by 300 fc |

TABLE 16-continued

Hold Visor Override Hysteresis Weighting and Recommendations

| Weight | Raise Hold Visor Override Hysteresis (Not enough light in automated control state) | Lower Hold Visor Override Hysteresis (Too much light in hold visor override state) |
|---|---|---|
| 4 | Hold visor override hysteresis <100 fc and 3+ transitions into hold visor override state over period of time (e.g., since the beginning of a day) Recommend: Set hold visor override hysteresis to 300 fc | Hold visor override hysteresis is >900 fc Recommend: Decrease hold visor override hysteresis by 500 fc |
| 5 | Hold visor override hysteresis <100 fc and 4+ transitions into hold visor override state over period of time (e.g., since the beginning of a day) Recommend: Set hold visor override hysteresis to 300 fc | N/A |

As shown in TABLE 16, the hold visor override hysteresis may be given different weights based on the hold visor override hysteresis values at an identified time (e.g., current time, a time displayed in graph 402, or a time otherwise selected by a user) and/or the number of hold visor override state transitions. Examples of recommended changes to the hold visor override hysteresis are also included in TABLE 16 in an attempt to fix the identified problems (e.g., to prevent the user from reporting the same problems under the same conditions).

TABLE 17 illustrates example weights and recommendations that may be given to work surface height values when a user indicates that too much light or not enough light is entering a space.

TABLE 17

Work Surface Height Weighting and Recommendations

| Weight | Raise Work Surface Height (Not enough light) | Lower Work Surface Height (Too much light) |
|---|---|---|
| 1 | Work surface height is >30" Recommend: No change | Work surface height is <30" Recommend: No change |
| 2 | Work surface height is <30" Recommend: Increase work surface height by 8" | Work surface height is <54" Recommend: Decrease work surface height by 8" |
| 3 | Work surface height is <18" Recommend: Increase work surface height by 8" | Work surface height is >54" Recommend: Decrease work surface height by 8" |
| 4 | Work surface height is <12" Recommend: Increase work surface height by 8" | N/A |
| 5 | Work surface height is <8" Recommend: Increase work surface height by 8" | N/A |

As shown in TABLE 17, the work surface height may be given different weights based on the work surface height values at an identified time (e.g., current time, a time displayed in graph 402, or a time otherwise selected by a user). The work surface height may be set to a default value (e.g., thirty inches). Examples of recommended changes to the work surface height are also included in TABLE 17 in an attempt to fix the identified problems (e.g., to prevent the user from reporting the same problems under the same conditions).

TABLE 18 illustrates example weights and recommendations that may be given to various manual override timeout period values when a user indicates that too much light or not enough light is entering a space.

TABLE 18

Manual Override Timeout Weighting and Recommendations

| Weight | Raise Manual Override Timeout (Movements of covering material are distracting) | Lower Manual Override Timeout (Too much light/ Not enough light) |
|---|---|---|
| 1 | Manual override timeout is until end of time period (e.g., day) or >120 minutes Recommend: No change | In manual override and manual override timeout <15 minutes Recommend: No change |
| 2 | Manual override timeout is <120 minutes Recommend: Increase manual override timeout by 60 minutes | In manual override and manual override timeout is <30 minutes Recommend: Decrease manual override timeout by 10 minutes |
| 3 | Manual override timeout is <60 minutes Recommend: Increase manual override timeout by 30 minutes | In manual override and manual override timeout is <60 minutes Recommend: Decrease manual override timeout by 15 minutes |
| 4 | Manual override timeout is <30 minutes Recommend: Increase manual override timeout by 15 minutes | In manual override delay and manual override timeout is <120 minutes Recommend: Decrease manual override timeout by 30 minutes |
| 5 | N/A | In manual override and manual override timeout is until the end of time period (e.g., day) or >120 minutes Recommend: If manual override timeout is until end of time period (e.g., day), set manual override timeout to thirty minutes. Otherwise, decrease manual override timeout by 60 minutes. |

As shown in TABLE 18, the manual override timeout may be given different weights based on whether the system is in a manual override state and/or the length of the manual override timeout period. Examples of recommended changes to the manual override timeout are also included in TABLE 18 in an attempt to fix the identified problems (e.g., to prevent the user from reporting the same problems under the same conditions).

The value of various motorized window treatment control parameters may be compared against one another to determine the recommended motorized window treatment parameter to adjust (e.g., at 604). The value assigned to each parameter may be different for each indicated problem. The motorized window treatment control parameters may be given an additional priority value that may assign priority of each recommendation when multiple parameters have the same weight value. The priority level of each parameter may be different for each indicated problem.

The weight values assigned to each motorized window treatment control parameter may also be used to recommend the amount to adjust the parameter. Based on the type of problem indicated by the user, the recommendation may include an amount to adjust that would move the assigned weight value of the parameter to a setting that would give the parameter a higher or lower weight value. The weight value may be increased when an increased adjustment may solve the problem and/or the weight value may be decreased when a decreased adjustment may solve the problem. When the recommended adjustment is to a higher or lower weight value that includes a range of values, the recommended adjustment value may be at the upper limit of the range, the lower limit of the range, and/or the middle value in the range. The recommended adjustment may also, or alternatively, put the control parameter in the same respective position in the higher or lower weight range as the control parameter resides in a weight range prior to adjustment.

The value may be increased or decreased by a single value in the weighting system or by multiple values. The recommended adjustment may also be based on the current daylight intensity level for parameters that are weighted based on the daylight intensity level. The recommended parameters for adjustment may be adjusted to a setting that may avoid a future adjustment based on the daylight intensity level at an identified time. There may be a cap on the daylight intensity level to avoid making too large of an adjustment.

Though the weight values provided herein for each motorized window treatment control parameter from range from one to five, any other values or scoring system may be implemented. Additionally, though example recommended values of adjustment for the parameters may be provided, other recommended values may be provided. The rules provided for determining each parameter value are also provided as examples, as other rules may be provided for determining the value assigned to each parameter.

FIGS. 7A-7D include a simplified flow diagram illustrating an example method 700 for determining one or more recommended adjustments to the motorized window treatment control parameters. The method 700, or portions thereof, may be performed by the system controller 110, the network device 166, and/or the remote computing device 168 for determining the one or more window treatment control parameters for being adjusted. The system controller 110, the network device 166, and/or the remote computing device 168 may determine the window treatment control parameters via communication and/or processing.

The method 700 may be used to determine one or more parameters that may be adjusted or recommended to the user for adjustment based on an indicated problem with the control of the motorized window treatments, a time of day, and/or the system state at the indicated time of day. The system state may be determined by the system based on the time of day at which the problem occurred. Based on the system state and the indicated problem at the time of day, the method 700 may be used to identify a subset of one or more parameters that may be recommended for adjustment. The recommended adjustment may include an amount to adjust each of the parameters to prevent the indicated problem from occurring again. If the subset of parameters selected includes more than one parameter, each of the parameters may be provided to the user as a recommended adjustment or each of the selected parameters may be weighted to select one or more of the parameters for being recommended to a user. For example, each of the parameters that are selected for recommended adjustment may be weighted using the weighting tables described herein and the parameter with the highest weight value may be recommended for adjustment. If multiple parameters have the same weight, the parameter with the highest priority may be recommended for adjustment.

Figure 7A:
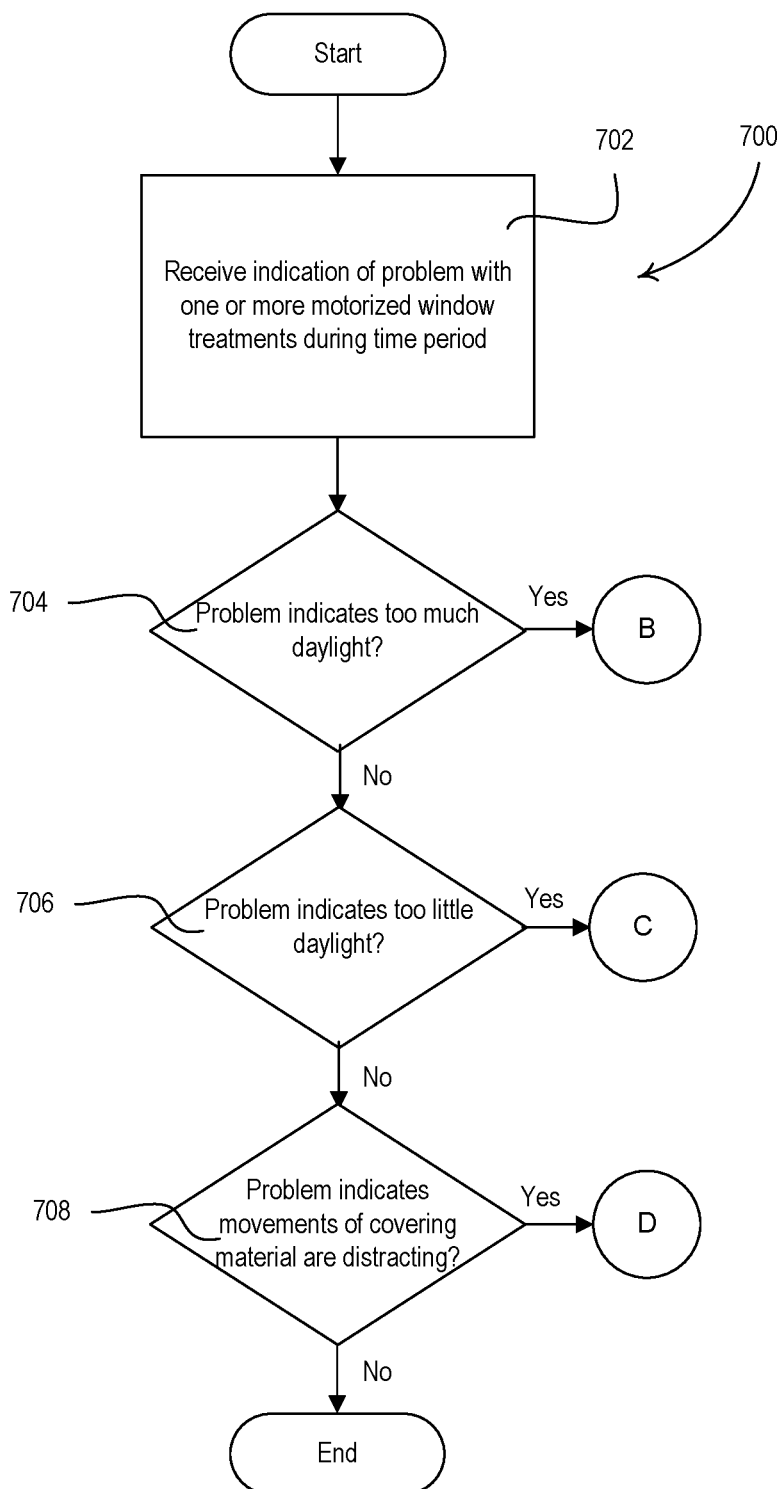
FIGS. 7A-7D include a simplified flow diagram illustrating an example method for determining a recommended adjustment to motorized window treatment control parameters.
Figure 7B:
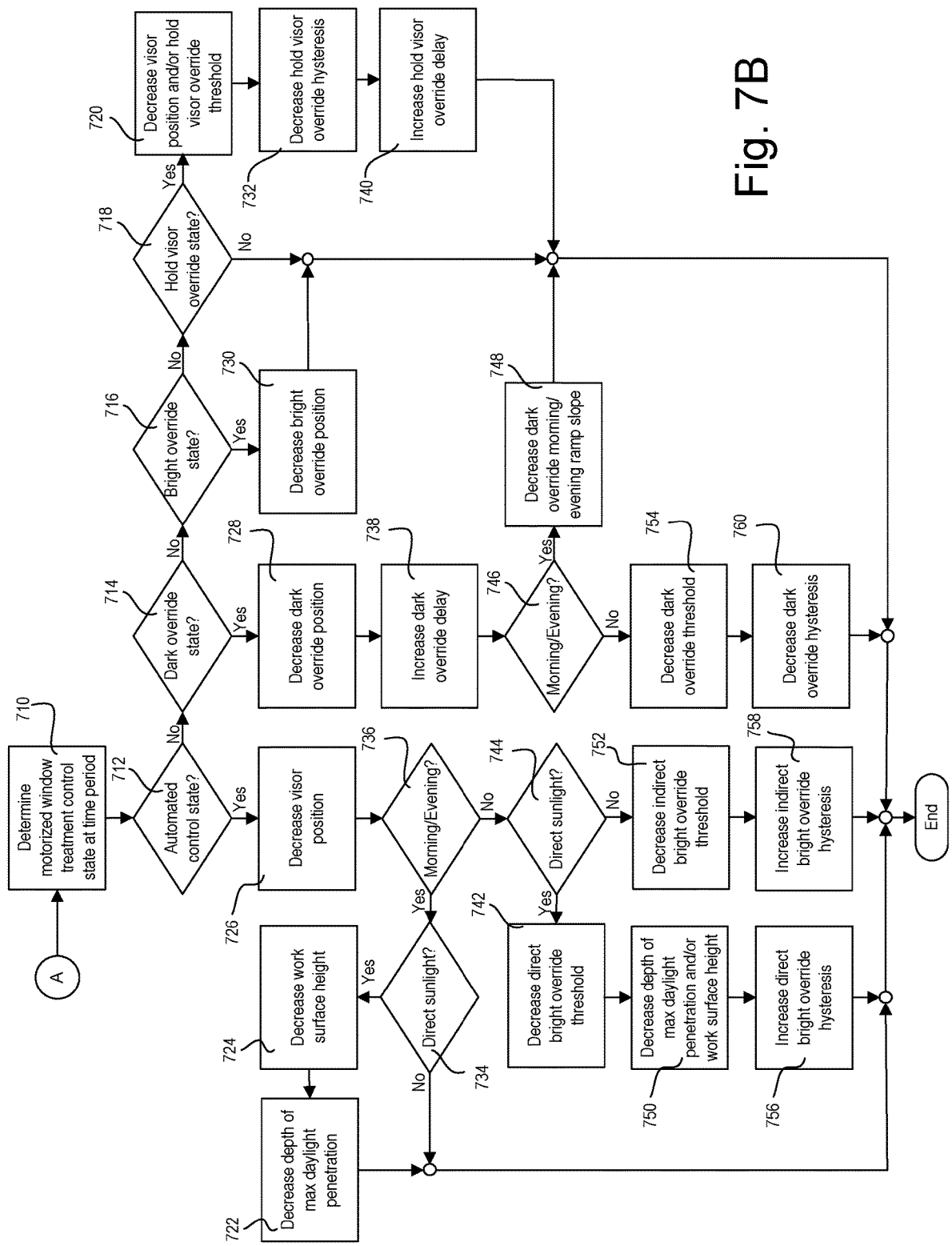

As shown in FIG. 7A, an indicated problem with the operation of one or more motorized window treatments during an identified time period may be received at 702. If, at 704, the indicated problem is that there is too much daylight in the space, the method 700 may proceed to FIG. 7B to determine the parameters that may be selected for being adjusted. As illustrated at FIG. 7B, the motorized window treatment control state may be determined for the indicated time period at 710. If, at 712, the motorized window treatment control state during the time period includes the automated control state, a subset of automated control parameters may be considered for being included in a recommended adjustment.

The subset of control parameters that may be used to determine the recommended adjustment to the motorized window treatment control parameters may include a decrease to the visor position, as indicated at 726. The subset of control parameters may be determined based on whether the time of day is the morning, the evening, or mid-day (e.g., between morning and evening). The morning and evening time periods may be predefined time periods based on the time of day or the angle of elevation of the sun. If the indicated period of time in which the problem occurred is determined to be during morning or evening at 736, the method 700 may move to 734 to determine whether daylight was being received directly at the indicated time period. If daylight was being received directly at the indicated time period, a decrease to the work surface height and/or a decrease to the depth of the maximum daylight penetration into the space may be included in the subset of control parameters at 724 and 722, respectively. If the time of day is determined to be mid-day at 736, the method 700 may proceed to 744.

At 744, the subset of control parameters may be determined based on whether the space in which the daylight is being received is receiving daylight directly (e.g., located at a façade that is facing the sun). When the daylight is directly received in the space at 744, the subset of control parameters may include a decrease to the direct bright override threshold at 742, a decrease in the depth of the maximum daylight penetration at 750, a decrease in the work surface height at 750, and/or an increase to the direct bright override hysteresis at 756. When the daylight is not being directly received in the space at 744 (e.g., when the sun is on the other side of the building), the subset of control parameters may include a decrease to the indirect bright override threshold at 752 and/or an increase to the indirect bright override hysteresis at 758.

If, at 710, the motorized window treatment control state is determined to be a control state other than the automated control state, the recommended adjustment may include adjustments that may affect the override control parameters. If the motorized window treatment control state is determined at 714 to be the dark override state, the subset of control parameters that may be used for determining the recommended adjustment may include a decrease to the dark override position at 728 and/or an increase to the dark override delay at 738. If the indicated period of time is determined to be during the morning or evening at 746, the subset of control parameters may include a decrease in the slope of the morning ramping period and/or the evening ramping period at 748. If the indicated period of time is determined to be during mid-day at 746, the subset of control parameters that may be used for determining the recommended adjustment may include a decrease to the dark override threshold at 754 and/or a decrease to the dark override hysteresis at 760.

If the motorized window treatment control state is determined to be the bright override state at 716, the subset of control parameters that may be used for determining the recommended adjustment may include a decrease to the bright override position at 730. The bright override position may be to the direct bright override position if the daylight is being received directly (e.g., directly on the façade) at the indicated time or to the indirect bright override position if the daylight is not being received directly (e.g., not directly on the façade).

When the motorized window treatment control state is determined to be the hold visor override state at 718, the subset of control parameters that may be used for determining the recommended adjustment may include a decrease to the visor position at 720, a decrease to the hold visor override threshold at 720, a decrease to the hold visor override hysteresis at 732, and/or an increase to the hold visor override delay at 740. The motorized window treatment control state may be in the hold visor override state when the daylight is being directly received (e.g., at a façade) and/or during mid-day.

Figure 7C:
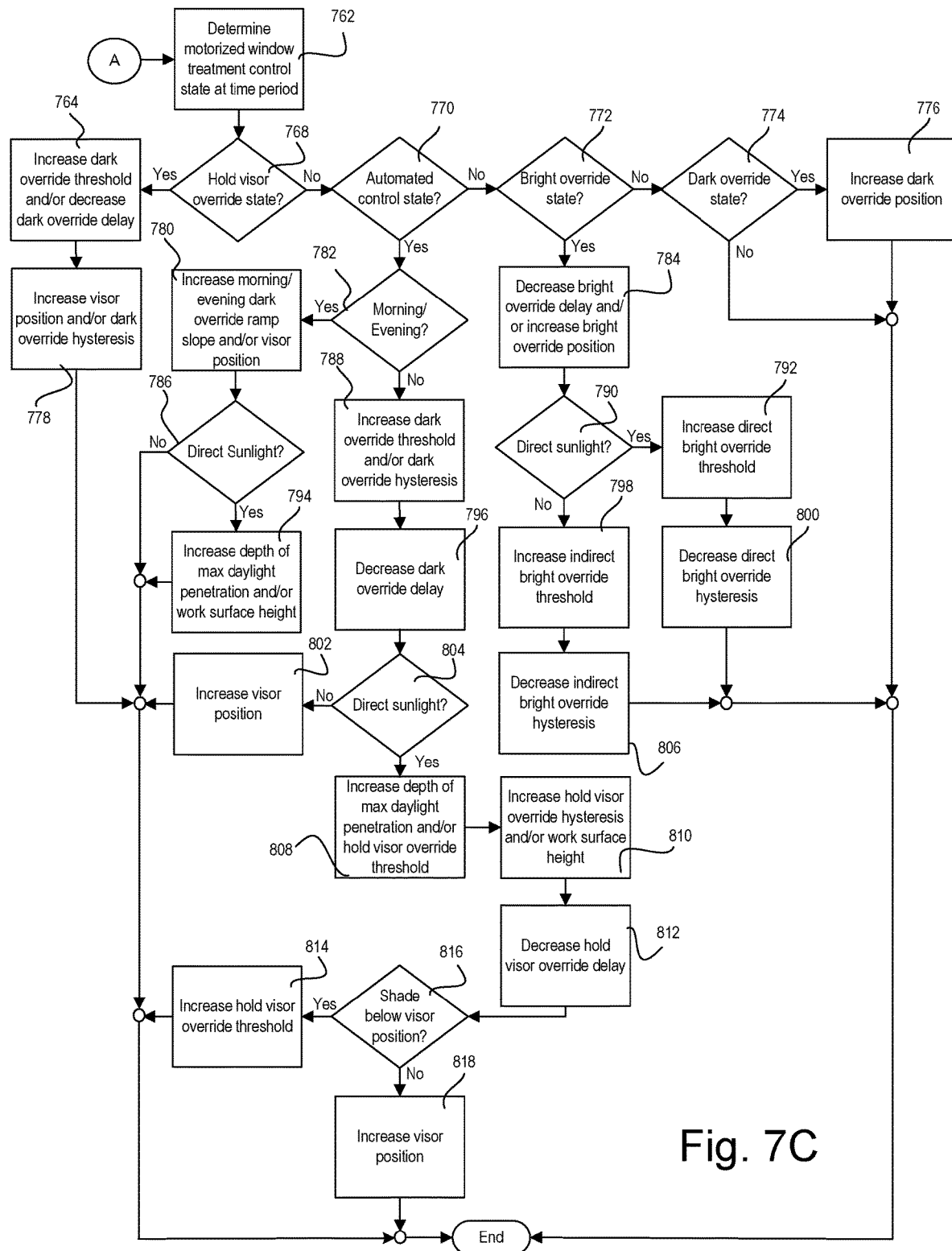

Referring again to FIG. 7A, if, at 706, the indicated problem is that there is too little daylight at the space, the method 700 may proceed to FIG. 7C. As illustrated at FIG. 7C, the motorized window treatment control state may be determined for the indicated time period at 762. If, at 768, the motorized window treatment control state at the time the problem occurred includes the hold visor override state, the subset of control parameters that may be used for determining the recommended adjustment may include an increase to the dark override threshold at 764, a decrease to the dark override delay at 764, an increase to the visor position at 778, and/or an increase to the dark override hysteresis at 778. The motorized window treatment control state may be in a hold visor override state when a façade is directly receiving daylight and/or during mid-day.

If, at 770, the motorized window treatment control state at the time the problem occurred includes the automated control state, the recommended adjustment may include an adjustments that may affect the automated control parameters. The subset of control parameters that may be used for determining the recommended adjustment may be based on whether the problem occurred during the morning, evening, or mid-day, as shown at 782. If the indicated period of time in which the problem occurred is determined at 782 to be during the morning or evening, the subset of control parameters may include an increase to the morning ramping slope of the dark override state, an increase to the evening ramping slope of the dark override state, and/or an increase to the visor position at 780. The subset may include the increase to the morning or evening ramping slope of the dark override state based on whether the indicated period of time is in the morning or evening, respectively. In another example, the morning and evening ramping slope may both be included in the subset of control parameters when the indicated period of time is in the morning or evening.

The control parameters included in the subset for adjustment may be determined based on whether the space is receiving daylight directly at 786. If daylight is being received directly at the time of the indicated problem, the subset of control parameters may include an increase to the depth of the maximum daylight penetration and/or an increase to the work surface height at 794.

If the indicated period of time in which the problem occurred is determined at 782 to be during mid-day, the subset of control parameters that may be used for determining the recommended adjustment may include an increase to the dark override threshold at 788, an increase to the dark override hysteresis at 788, and/or a decrease to the dark override delay at 796. The control parameters included in the subset may be determined based on whether the space is receiving daylight directly at 804. If, at 804, the space is determined not to be receiving daylight directly (e.g., façade is not facing the sun), the subset of control parameters may include an increase in the visor position at 802. The visor position may be increased at 802 based on whether the motorized window treatments are in the visor position. For example, the visor position may be increased at 802 when it is determined that the motorized window treatments are in the visor position at the time of the indicated problem. If, at 804, the space is determined to be receiving daylight directly (e.g., façade is facing the sun), the subset of control parameters may include an increase in the depth of the maximum daylight penetration distance at 808, an increase to the hold visor override threshold at 808, an increase to the hold visor override hysteresis at 810, an increase to the work surface height at 810, and/or a decrease to the hold visor override delay at 812.

The subset of control parameters that may be used to determine the recommended adjustment may be based on the shade position of one or more shades in the space. If, at 816, the shade position is determined to be below the visor position, the subset of control parameters may include an increase to the hold visor override threshold at 814. If, at 816, the shade position is at the visor position, the subset of control parameters may include an increase to the visor position at 818.

If, at 772, the motorized window treatment control state at the indicated time the problem occurred is determined to be the bright override state, the subset of control parameters that may be used for determining the recommended adjustment may include a decrease to the bright override delay and/or an increase to the bright override position at 784. When the space is determined at 790 to be receiving daylight directly (e.g., façade is facing the sun), the subset of control parameters may include an increase to the direct bright override threshold at 792 and/or a decrease to the direct bright override hysteresis at 800. When the space is determined at 790 not to be receiving daylight directly (e.g., façade is not facing the sun), the subset of control parameters may include an increase to the indirect bright override threshold at 798 and/or a decrease to the bright override hysteresis at 806. If the motorized window treatment control state is determined at 774 to be the dark override state, the subset of control parameters that may be used for determining the recommended adjustment may include an increase to the dark override position at 776.

Figure 7D:
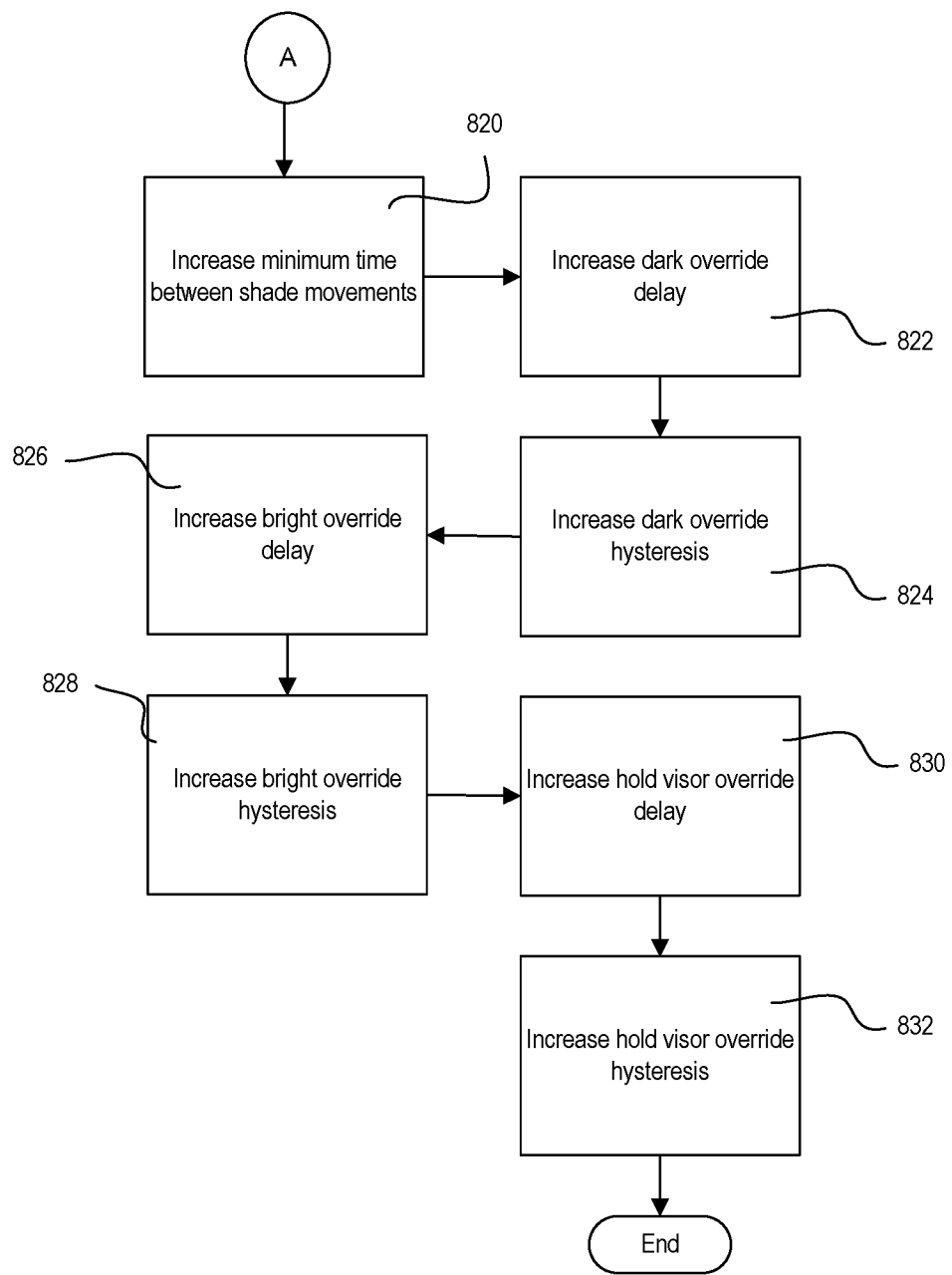

Referring again to FIG. 7A, if, at 708, the indicated problem is that the movements of the covering material are distracting, the method 700 may proceed to FIG. 7D. As illustrated at FIG. 7D, various adjustments to the motorized window treatment control parameters may be made to reduce the distraction that may be caused to an occupant of the space. One or more motorized window treatment control parameters may be included in the subset of control parameters that may be used for determining the recommended adjustment. The subset of control parameters may include an increase to the minimum time between shade movements at 820, an increase to the dark override delay at 822, an increase to the dark override hysteresis at 824, an increase to the bright override delay at 826, an increase to the bright override hysteresis at 828, an increase to the hold visor override delay at 830, and/or an increase to the hold visor override hysteresis at 832. The increase to the bright override hysteresis at 828 may be an increase to the direct bright override hysteresis and/or the indirect bright override hysteresis depending on whether the space is located on a façade that is directly facing the sun. Similarly, the increase to the bright override delay at 826 may be an increase to the direct bright override delay and/or the indirect bright override delay depending on whether the space is located on a façade that is directly facing the sun. One or more of the various adjustments that are illustrated in FIG. 7D may be added to the subset of control parameters that may be used for determining a recommended adjustment based on a control state of the system at the time of the indicated problem, or regardless of the control state.

Though FIGS. 7A-7D illustrate a number of control parameters that may be determined for being adjusted in response to indicated problems in a space, one or more of the control parameters, or other control parameters, may be determined, added to the subset of control parameters, and/or adjusted. Additionally, though FIGS. 7A-7D illustrate a number of motorized window treatment control states that may be determined, additional or alternative control states may be determined. For example, the motorized window treatment control state at the indicated time the problem occurred may be determined to be the manual override state (not shown). If the motorized window treatment control state at the indicated time the problem occurred is the manual override state and the indicated problem is that there is too much or not enough light being received at a space, the manual override timeout period may be lowered. If the motorized window treatment control state at the indicated time the problem occurred is the manual override state and the indicated problem is that there is that the movements of the covering material are distracting, the manual override timeout period may be raised.

One or more of the adjustments to the motorized window treatment control parameters in the subset determined using the method 700 may be provided to a user or implemented automatically. For example, each of the adjustments in the subset may be provided to a user or implemented or one or more of the adjustments in the subset may be selected for being provided to a user or implemented. If there are multiple adjustments in the subset of parameters determined using the method 700, each of the adjustments may be given a priority such that the determined adjustment, or set of adjustments, with the highest priority may be recommended or implemented. The recommended adjustments may be prioritized according to a weight that is assigned to the parameters in the subset. The weight values and/or recommendations may be assigned to each variable using the TABLES 1-18 provided herein, for example. The control parameters may be given a priority value relative to the other control parameters, such that adjustments to control parameters with the same weight value may be recommended or implemented. The control parameter, or set of control parameters, with the highest weight value and/or priority may be recommended for adjustment or automatically adjusted. The set of control parameters may be a predetermined number of control parameters or may be determined dynamically based on the weight value and/or priority of each of the control parameters. For example, the control parameters with the same weight and/or priority value may be recommended for adjustment or automatically adjusted. The amount to adjust the recommended parameters may be predetermined or may be based on the weight that is assigned to the parameters (e.g., increase or decrease by an amount according to the weight value).

The recommended adjustments to the motorized window treatment control parameters may be provided to the user via a user interface. FIG. 8 depicts an example user interface 850 that may be used for providing the recommended adjustments to the motorized window treatment control parameters. As shown in FIG. 8, the user interface 850 may include an adjustment type 852, a current value 854 of the motorized window treatment control parameter to be adjusted, a recommended adjustment value 856 to which the current value 854 may be changed, and/or the motorized window treatments 858 to which the recommendation may be applied. The user interface 850 may include an indication of the adjustment type 852 (e.g., in a sentence to the user) and other information in the user interface 850 may be provided to the user upon indicating that the user would like to view details of the adjustment. For example, the user may be provided with the adjustment type 852 and may select a button indicating that the user would like to view the details of the adjustment to be provided with other information. The adjustment type 852 may include the motorized window treatment control parameter to be adjusted and/or a recommended adjustment to the parameter. The recommended adjustment value 856 may be edited by the user. The motorized window treatments 858 may be indicated by a shade group, a location, or another identifier. The user interface 850 may include various assumptions on which the recommendation is being provided (e.g., control state, daylight being received directly/indirectly, etc.).

The user interface 850 may display assumptions or defaults used in determining the recommended adjustment. For example, the user interface 850 may indicate an assumed state, whether the space is believed to be in the direct sunlight, a daylight intensity level, and/or the like. The user interface 850 may also, or alternatively include a description of the motorized window treatment control parameter that is being recommended for adjustment.

While the user interface 850 may be provided for a single motorized window treatment control parameter, multiple recommendations may be made using the interface 850. When the user agrees with the recommended adjustments in the user interface 850, the user may preview the adjustments by pressing the preview adjustments button 860 and/or submit the adjustments for implementation using the make adjustments button 862. The adjustments may be previewed on another user interface, such as the user interface 400 as shown in FIG. 4B, for example. The user interface 850 may indicate to the user how to make the recommended adjustments.

Figure 9:
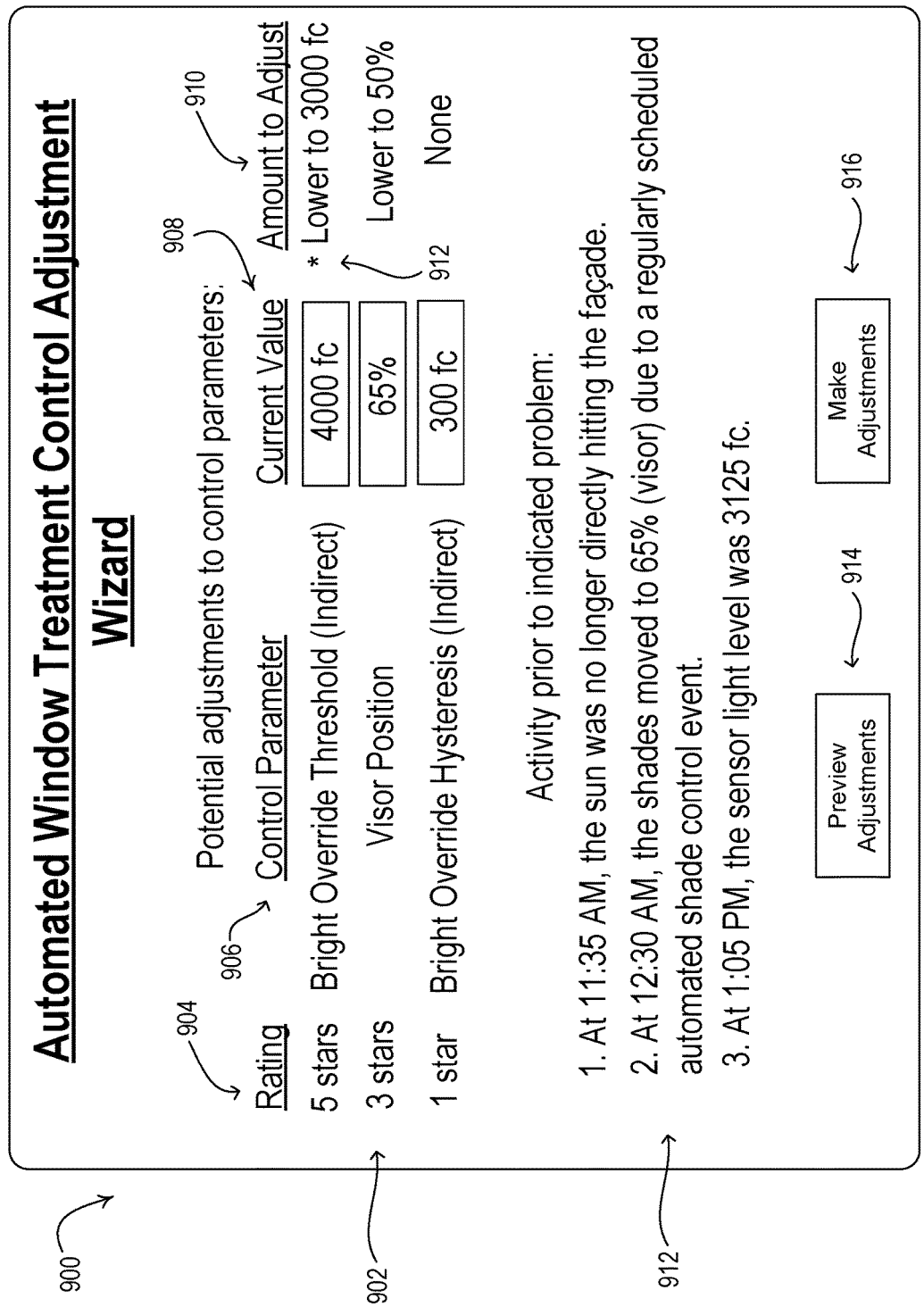
FIG. 9 depicts another example user interface that may be used for providing recommended adjustments to motorized window treatment control parameters.

FIG. 9 depicts another example user interface 900 that may be used for providing the recommended adjustments to the motorized window treatment control parameters. The information proved in user interface 900 may be provided as a separate interface or included with the information provided in the user interface 850. As shown in FIG. 9, the user interface 900 may include one or more recommended adjustments 902. The recommended adjustments 902 may include adjustment information, such as an adjustment rating 904, a control parameter 906 to be adjusted, a current value 908 of the control parameter 906, and/or a recommended adjustment value 910 to which the current value 908 may be changed. The current value 908 may be entered by the user (e.g., via a text box) or may be provided by the system.

The adjustment rating 904 may indicate, or be based on, the weight value assigned to the control parameter. The recommended adjustments 902 may be listed in a recommended order of priority. The priority may be in the order of the rating 904 for each recommended adjustment. The recommended adjustment with the highest priority may be indicated to the user, such as with an asterisk 912, highlighting, or other identifier.

The user interface 900 may include system events 912 that occurred prior to the indicated problem. The system events 912 may assist the user in deciding whether to make a recommended adjustment. The user interface 900 may display the system events 912 that occurred within a predefined period of time prior to the time the indicated problem occurred. The period of time may be set by the system or indicated by the user. The system events may include changes to the position of the window treatment, a reason for each change of the position of the window treatment, changes to the automated control state, changes to a sensed amount of daylight, changes to the sun being on or off of a façade, changes to the direct bright override threshold, changes to the indirect bright override threshold, changes to the dark override threshold, changes to the visor override threshold, and/or other changes to the control parameters prior to the indicated problem. The user interface 900 may indicate the most recent change to one or more of the system events that occurred within the predefined period of time (e.g., current day).

A user may select one or more of the recommended adjustments 902 for being previewed and/or implemented. The user may preview the adjustments by pressing the preview adjustments button 914 and/or submit the adjustments for implementation using the make adjustments button 916. The adjustments may be previewed on another user interface, such as the user interface 400 as shown in FIG. 4B, for example. The user interface 900 may indicate to the user how to make the recommended adjustments.

While the user interface 850, 900 includes a recommended adjustment to the motorized window treatment control parameters, the user interface 850, 900 may indicate that based on the current system settings, no adjustment to the current value 854, 908 or no adjustment is recommended. For example, as shown in the user interface 900, no change to the current value 908 may be recommended for a control parameter when the control parameter already has the highest or lowest rating and the recommended change would be to increase or decrease the current value, respectively. In another example, no change to the current value 854, 908 may be recommended when the user indicates that the space is receiving too much light or not enough light and it is determined that the shades were already fully-opened or fully-closed, respectively, at the time of the indicated problem. The reason for the problem indicated by the user may be determined to be due to a temporary condition (e.g., a passing cloud) that may not be used to adjust the control parameters. As a result, no adjustment may be recommended. When no recommended adjustment to the control parameters is made, the user interface 850, 900 may indicate that no adjustment is recommended and/or inform the user as to the reason why no adjustment is recommended.

The user interface 850, 900 may provide adjustments other than to the motorized window treatment control parameters. For example, when the user indicates that the space is receiving too much light at an identified time and it is determined that the shades were already closed or lower than a predetermined threshold at that time, the user interface 850, 900 may recommend a change in the covering material. The recommendation may include a covering material with a lower transmittance fabric than the fabric currently being used.

The user interface 850, 900 may be displayed on the network device 166 for providing recommended adjustments to the user. The user interface 850 may be displayed via a local application or a remote application, such as a web interface provided by the system controller 110 or the remote computing device 168, for example.

Figure 10:
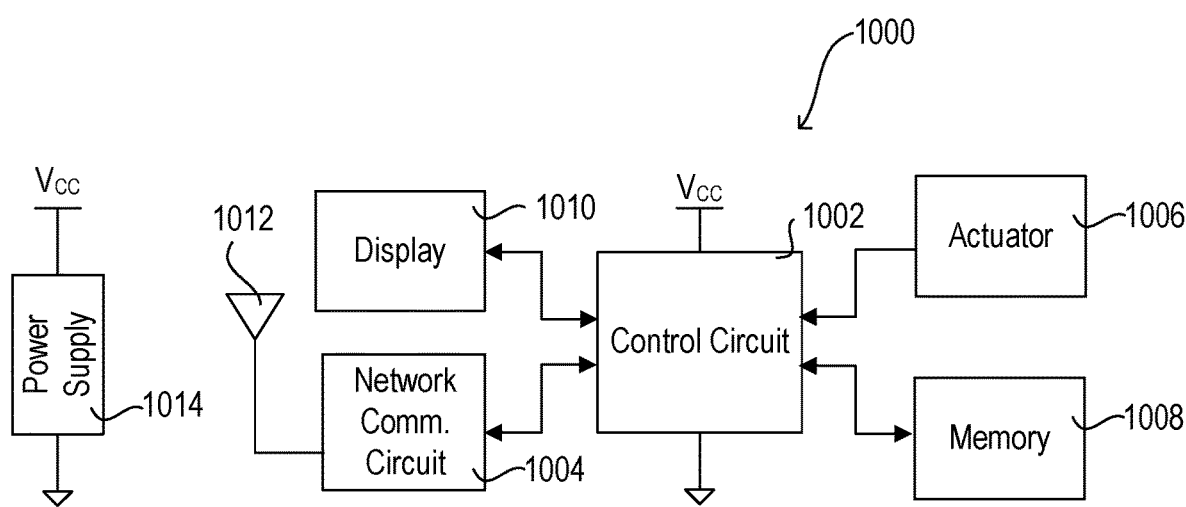
FIG. 10 is a simplified block diagram illustrating an example computing device.

FIG. 10 is a block diagram illustrating an example computing device 1000, such as the network device 166, and/or the remote computing device 168 for example. The computing device 1000 may be a personal computer, a laptop, a tablet, a smart phone, and/or other suitable network communication device (e.g., an Internet-Protocol-enabled device), for example. The computing device 1000 may be used to control and/or configure control of one or more load control devices, such as a motorized window treatment for example. The computing device 1000 may comprise a control circuit 1002, which may include one or more of a processor (e.g., a microprocessor), a microcontroller, a programmable logic device (PLD), a field programmable gate array (FPGA), an application specific integrated circuit (ASIC), or any suitable processing device. The control circuit 1002 may perform signal coding, data processing, power control, image processing, input/output processing, and/or any other functionality that enables the computing device 1000 to perform as described herein.

The control circuit 1002 may store information in and/or retrieve information from the memory 1008. The memory 1008 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 1002 may access the memory 1008 for executable instructions and/or other information that may be used by the computing device 1000. The control circuit 1002 may store the unique identifiers (e.g., serial numbers) of the control devices to which the computing device 1000 may be associated in the memory 1008. The control circuit 1002 may access instructions in the memory 1008 for controlling and/or configuring control of one or more load control devices.

The computing device 1000 may comprise a network communication circuit 1004, which may be adapted to perform wired and/or wireless communications (e.g., with the system controller device 110 or another device over a network) on behalf of the computing device 1000. The network communication circuit 1004 may be a wireless communication circuit, for example, including an RF transceiver coupled to an antenna 1012 for transmitting and/or receiving RF signals (e.g., the RF signals 106 shown in FIG. 1). The network communication circuit 1004 may communicate using Wi-Fi, a proprietary protocol (e.g., the ClearConnect® protocol), Bluetooth®, or any other RF communications. The control circuit 1002 may be coupled to the network communication circuit 1004 for transmitting and/or receiving digital messages via RF signals.

The computing device 1000 may comprise an actuator 1006. The control circuit 1002 may be responsive to the actuator 1006 for receiving a user input. For example, the control circuit 1002 may be operable to receive a button press from a user on the computing device 1000 for making a selection or performing other functionality on the computing device 1000.

The computing device 1000 may comprise a display 1010. The control circuit 1002 may be in communication with a display 1010 for displaying information to a user. The communication between the display 1010 and the control circuit 1002 may be a two way communication, as the display 1010 may include a touch screen module capable of receiving information from a user and providing such information to the control circuit 1002.

The computing device 1000 may comprise a power supply 1014 for generating a DC supply voltage Vcc for powering the control circuit 1002, the network communication circuit 1004, the memory 1008, the display 1010, and/or other circuitry of the computing device 1000. The power supply 1014 may be a battery or another source of power for the computing device 1000.

Figure 11:
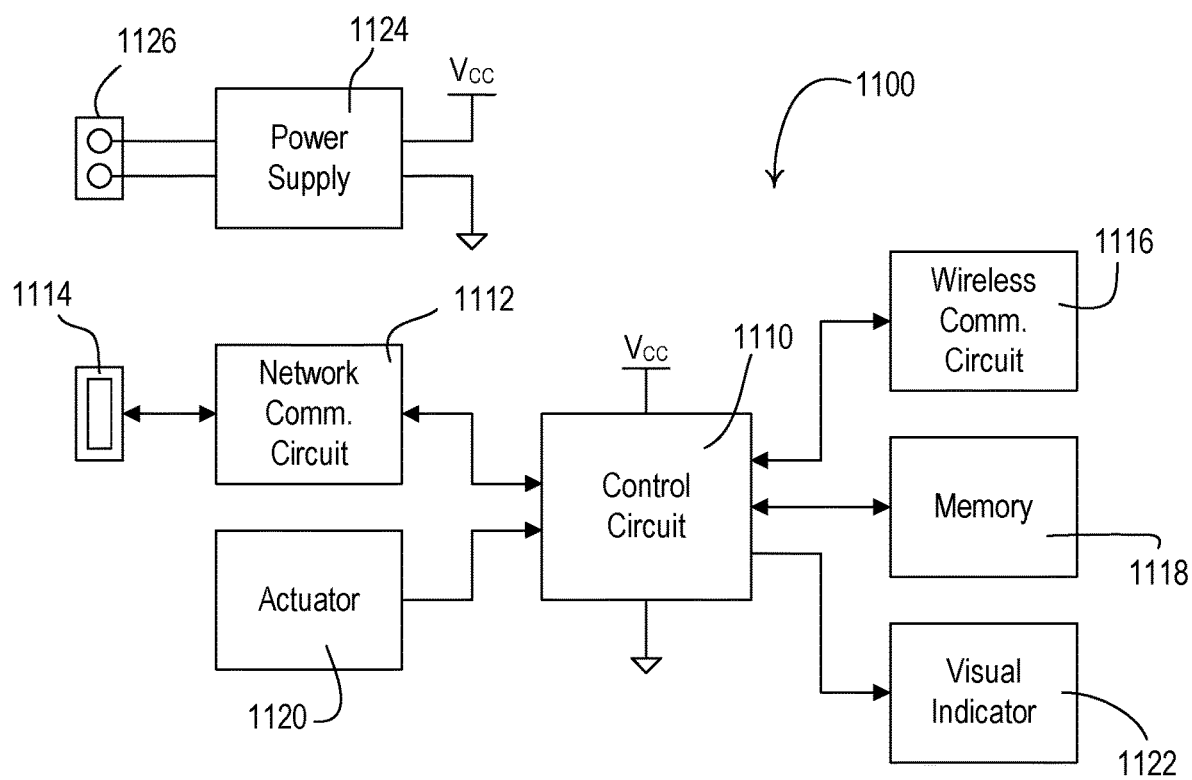
FIG. 11 is a simplified block diagram illustrating an example system controller device.

FIG. 11 is a simplified block diagram of an example system controller device 1100, which may be deployed as, for example, the system controller device 110 of the load control system 100 shown in FIG. 1. The system controller device 1100 may comprise a control circuit 1110, which may include one or more of a processor (e.g., a microprocessor), a microcontroller, a programmable logic device (PLD), a field programmable gate array (FPGA), an application specific integrated circuit (ASIC), or any suitable processing device. The control circuit 1110 may perform signal coding, data processing, power control, input/output processing, and/or any other functionality that enables the system controller device 1100 to perform as described herein. The system controller device 1100 may comprise a network communication circuit 1112 that may be coupled to a network connector 1114 (e.g., an Ethernet jack), which may be adapted to be connected to a wired digital communication link (e.g., an Ethernet communication link) for allowing the control circuit 1110 to communicate with network devices on a network. The network communication circuit 1112 may be configured to be wirelessly connected to the network, e.g., using Wi-Fi technology to transmit and/or receive RF signals (e.g., the RF signals 106 shown in FIG. 1).

The system controller device 1100 may comprise a wireless communication circuit 1116, for example, including an RF transceiver coupled to an antenna for transmitting and/or receiving RF signals (e.g., the RF signals 106 shown in FIG. 1). The wireless communication circuit 1116 may communicate using a proprietary protocol (e.g., the ClearConnect® protocol). The control circuit 1110 may be coupled to the wireless communication circuit 1116 for transmitting digital messages via the RF signals 106, for example, to control the load control devices in the load control system 100 in response to digital messages received via the network communication circuit 1112. The control circuit 1110 may be configured to receive digital messages, for example, from the load control devices and/or the input devices.

The control circuit 1110 may be responsive to an actuator 1120 for receiving a user input. For example, the control circuit 1110 may be operable to associate the system controller device 1100 with one or more control devices of the load control system 100 in response to actuations of the actuator 1120 during a configuration procedure of the load control system 100. The system controller device 1100 may comprise additional actuators to which the control circuit 1110 may be responsive.

The control circuit 1110 may store information in and/or retrieve information from the memory 1118. The memory 1118 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 1110 may access the memory 1118 for executable instructions and/or other information that may be used by the system controller device 1100. The control circuit 1110 may store the unique identifiers (e.g., serial numbers) of the control devices to which the system controller device 1100 is associated in the memory 1118.

The control circuit 1110 may illuminate a visual indicator 1122 to provide feedback to a user of the load control system 100. For example, the control circuit 1110 may blink or strobe the visual indicator 1122 to indicate a fault condition. The control circuit 1110 may be operable to illuminate the visual indicator 1122 different colors to indicator different conditions or states of the system controller device 1100. The visual indicator 1122 may be illuminated by, for example, one or more light-emitting diodes (LEDs). The system controller device 1100 may comprise more than one visual indicator.

The system controller device 1100 may comprise a power supply 1124 for generating a DC supply voltage Vcc for powering the control circuit 1110, the network communication circuit 1112, the wireless communication circuit 1116, the memory 1118, and/or other circuitry of the system controller device 1100. The power supply 1124 may be coupled to a power supply connector 1126 (e.g., a USB port) for receiving a supply voltage (e.g., a DC voltage) and/or for drawing current from an external power source.

Although features and elements have been described in a particular order or relation to particular embodiments, many other variations, modifications, and other uses are apparent from the description provided herein. For example, while various types of hardware and/or software may be described for performing various features, other hardware and/or software modules may be implemented. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs). The disclosure herein may not be limited by the examples provided.

What is claimed is:

1. A motorized window covering system controller, comprising:
control circuitry communicatively coupled to each of a plurality of motorized window coverings, the control circuitry to:
identify a window covering group proximate the system user, the window covering group including at least one motorized window covering;
retrieve one or more operational parameters associated with the at least one motorized window covering;
cause a generation of a graphical user interface that includes a plurality of queries associated with one or more environmental parameters proximate the system user;
determine a plurality of proposed operational adjustments to the at least one motorized window covering based on the system user input to each of the plurality of queries and the one or more retrieved operational parameters;
determine a respective weight value for each of the proposed operational adjustments; and adjust the one or more operational parameters of the at least one motorized window covering included in the identified motorized window covering group using the one or more proposed operational adjustments having the greatest determined weight value.

2. The window covering system of claim 1, further comprising at least one ambient light sensor and wherein the one or more environmental parameters include an illumination level proximate the system user.

3. The window covering system of claim 2 wherein the one or more operational parameters include a visor position of the at least one motorized window covering and wherein the one or more proposed operational adjustments include adjusting the visor position of the at least one motorized window covering.

4. The window covering system of claim 2 wherein the one or more operational parameters include a dark override threshold value of the at least one motorized window covering and wherein the one or more proposed operational adjustments include adjusting the dark override threshold value of the at least one motorized window covering.

5. The window covering system of claim 2 wherein the one or more operational parameters include a dark override position of the at least one motorized window covering and wherein the one or more proposed operational adjustments include adjusting the dark override position of the at least one motorized window covering.

6. The window covering system of claim 2 wherein the one or more operational parameters include a dark override delay associated with movement of the at least one motorized window covering and wherein the one or more proposed operational adjustments include adjusting the dark override delay of the at least one motorized window covering.

7. The window covering system of claim 2 wherein the one or more operational parameters include too frequent entry of the at least one motorized window covering into a dark override operating state and wherein the one or more proposed operational adjustments include adjusting the dark override hysteresis value of the at least one motorized window covering.

8. The window covering system of claim 2 wherein the one or more operational parameters include a direct bright override threshold value associated with the at least one motorized window covering and wherein the one or more proposed operational adjustments include adjusting the direct bright override threshold value of the at least one motorized window covering.

9. The window covering system of claim 2 wherein the one or more operational parameters include an indirect bright override threshold value associated with the at least one motorized window covering and wherein the one or more proposed operational adjustments include adjusting the indirect bright override threshold value of the at least one motorized window covering.

10. The window covering system of claim 2 wherein the one or more operational parameters include a bright override position of the at least one motorized window covering and wherein the one or more proposed operational adjustments include adjusting the position of the at least one motorized window covering when in a bright override state.

11. The window covering system of claim 2 wherein the one or more operational parameters include a hold visor threshold value associated with the at least one motorized window covering and wherein the one or more proposed operational adjustments include adjusting at least one of: the hold visor override threshold value or the hold visor override hysteresis value.

12. The window covering system of claim 2 wherein the one or more operational parameters include a bright override delay associated with the at least one motorized window covering and wherein the one or more proposed operational adjustments include adjusting the bright override delay of the at least one motorized window covering.

13. The window covering system of claim 2 wherein the one or more operational parameters include too frequent entry of the at least one motorized window covering into a direct bright override operating state and wherein the one or more proposed operational adjustments include adjusting the direct bright override hysteresis value of the at least one motorized window covering.

14. The window covering system of claim 2 wherein the one or more operational parameters include too frequent entry of the at least one motorized window covering into an indirect direct bright override operating state and wherein the one or more proposed operational adjustments include adjusting the indirect bright override hysteresis value of the at least one motorized window covering.

15. The window covering system of claim 2 wherein the one or more operational parameters include a rate of the at least one motorized window covering when entering or exiting a dark override operating state wherein the one or more proposed operational adjustments include adjusting the dark override ramp associated with the at least one motorized window covering.

16. The window covering system of claim 2 wherein the one or more operational parameters include a depth of light penetration proximate the system user wherein the one or more proposed operational adjustments include adjusting the depth of maximum daylight penetration of the at least one motorized window covering.

17. The window covering system of claim 2 wherein the one or more operational parameters include a visor override delay associated with movement of the at least one motorized window covering into a visor operating state and wherein the one or more proposed operational adjustments include adjusting the hold visor override delay of the at least one motorized window covering.

18. The window covering system of claim 2 wherein the one or more operational parameters include too frequent entry of the at least one motorized window covering into an hold visor override operating state and wherein the one or more proposed operational adjustments include adjusting the hold visor override hysteresis value of the at least one motorized window covering.

19. The window covering system of claim 2 wherein the one or more operational parameters include movement of the at least one motorized window covering and wherein the one or more proposed operational adjustments include adjusting the manual override timeout value of the at least one motorized window covering.

20. A motorized window covering control method, comprising:
    identifying, by control circuitry, a window covering group proximate a system user, the window covering group including at least one motorized window covering;
    retrieving one or more operational parameters associated with the at least one motorized window covering;
    causing a generation of a graphical user interface that includes a plurality of queries associated with one or more environmental parameters proximate the system user;

determining a plurality of proposed operational adjustments to the at least one motorized window covering based on the system user input to each of the plurality of queries and the one or more retrieved operational parameters;

determining a respective weight value for each of the proposed operational adjustments; and adjusting the one or more operational parameters of the at least one motorized window covering included in the identified motorized window covering group using the one or more proposed operational adjustments having the greatest determined weight value.

21. A non-transitory, machine-readable, storage device that includes instructions that, when executed by control circuitry, causes the control circuitry to:

identify a window covering group proximate a system user, the window covering group including at least one motorized window covering;

retrieve one or more operational parameters associated with the at least one motorized window covering;

cause a generation of a graphical user interface that includes a plurality of queries associated with one or more environmental parameters proximate the system user;

determine a plurality of proposed operational adjustments to the at least one motorized window covering based on the system user input to each of the plurality of queries and the one or more retrieved operational parameters;

determine a respective weight value for each of the proposed operational adjustments; and adjust the one or more operational parameters of the at least one motorized window covering included in the identified motorized window covering group using the one or more proposed operational adjustments having the greatest determined weight value.

* * * * *